US011015922B2

(12) United States Patent
Lu et al.

(10) Patent No.: US 11,015,922 B2
(45) Date of Patent: *May 25, 2021

(54) PHYSICAL PARAMETER ESTIMATING METHOD, PHYSICAL PARAMETER ESTIMATING DEVICE, AND ELECTRONIC APPARATUS USING SAMPLING THEOREM IN THE FRACTIONAL FOURIER TRANSFORM DOMAIN

(71) Applicant: Beijing Institute of Technology, Beijing (CN)

(72) Inventors: Mingfeng Lu, Beijing (CN); Jinmin Wu, Beijing (CN); Ran Tao, Beijing (CN); Zhen Guo, Beijing (CN); Feng Zhang, Beijing (CN)

(73) Assignee: Beijing Institute of Technology, Beijing (CN)

( * ) Notice: Subject to any disclaimer, the term of this patent is extended or adjusted under 35 U.S.C. 154(b) by 64 days.

This patent is subject to a terminal disclaimer.

(21) Appl. No.: 16/543,879

(22) Filed: Aug. 19, 2019

(65) Prior Publication Data
US 2019/0376783 A1    Dec. 12, 2019

Related U.S. Application Data

(63) Continuation-in-part of application No. 15/447,307, filed on Mar. 2, 2017, now Pat. No. 10,429,169.

(30) Foreign Application Priority Data

Aug. 19, 2016   (CN) .......................... 201610695189.X

(51) Int. Cl.
*G01B 9/02*     (2006.01)
*G01B 11/24*    (2006.01)
*G06T 5/00*     (2006.01)

(52) U.S. Cl.
CPC ...... *G01B 11/2441* (2013.01); *G01B 9/02043* (2013.01); *G06T 5/002* (2013.01); *G06T 2207/20056* (2013.01)

(58) Field of Classification Search
CPC ............ G01B 11/2441; G01B 9/02043; G01B 11/255; G06T 5/002; G06T 2207/20056
See application file for complete search history.

(56) References Cited

U.S. PATENT DOCUMENTS 10,429,169 B2 *  10/2019  Lu ............................ G01B 9/02
2007/0038047 A1   2/2007  Winther et al.

* cited by examiner

*Primary Examiner* — Hwa Andrew Lee
(74) *Attorney, Agent, or Firm* — Venable LLP

(57) ABSTRACT

A physical parameter estimating method, a physical parameter estimating device, and electronic apparatus are disclosed. The method includes: reading a Newton's rings fringe pattern obtained by performing an interferometric measurement on a unit to be measured; downsampling the Newton's rings fringe pattern to obtain a downsampled Newton's rings fringe pattern; calculating a magnitude spectrum of an intensity distribution signal of at least one first-direction pixel set in the downsampled Newton's rings fringe pattern under each fractional Fourier transform (FRFT) order in a searching range of FRFT orders, the first-direction direction pixel set including a line of pixels in a first direction, the first direction being one of a row direction and a column direction of the downsampled Newton's rings fringe pattern; determining a matched order of the intensity distribution signal according to the calculated magnitude spectrums; and estimating a physical parameter involved in the interferometric measurement according to at least the matched order. Therefore, physical parameters of the unit to be measured can be estimated with high accuracy even in presence of noise and obstacles in the fringe pattern.

20 Claims, 16 Drawing Sheets

X-axis

PHYSICAL PARAMETER ESTIMATING METHOD, PHYSICAL PARAMETER ESTIMATING DEVICE, AND ELECTRONIC APPARATUS USING SAMPLING THEOREM IN THE FRACTIONAL FOURIER TRANSFORM DOMAIN

CROSS REFERENCE

This application claims the benefit of and priority to U.S. patent application Ser. No. 15/447,307 filed on Mar. 2, 2017, entitled "PHYSICAL PARAMETER ESTIMATING METHOD, PHYSICAL PARAMETER ESTIMATING DEVICE, AND ELECTRONIC APPARATUS," and Chinese Patent Application No. 201610695189.X filed on Aug. 19, 2016, entitled "PHYSICAL PARAMETER ESTIMATING METHOD, PHYSICAL PARAMETER ESTIMATING DEVICE, AND ELECTRONIC APPARATUS," the disclosure of each of which is incorporated herein by reference in its entirety.

TECHNICAL FIELD

The present disclosure relates to the technical field of interferometric measurement, and more particularly, to a physical parameter estimating method, a physical parameter estimating device, an electronic apparatus, a computer program product, and a computer-readable storage medium thereof.

BACKGROUND

An accurate measurement of physical parameters of a device (for example, optical parameters of an optical device) is crucial in a procedure of device measurement and fabrication. Contact measuring methods require polishing processing on a surface of a unit to be measured, which causes abrasion to the unit, thus non-contact measuring methods are usually adopted at present.

An interferometric measurement plays an important role in the non-contact measuring methods, and a key point thereof is to analyze and process an interference fringe pattern (for example, a Newton's rings fringe pattern) generated by performing the interferometric measurement on the unit to be measured, so as to obtain various physical parameters, such as curvature radius, vertex position, wavelength of incident light, refractive index of media, deformation, displacement of the unit.

A simplified method for processing the Newton's rings fringe pattern (a basic interference fringe pattern) is a ring-counting calculating method, which measures the interference fringe pattern by using a reading microscope, obtains diameter values of two orders of dark fringes, and calculates a physical parameter of the unit to be measured on the basis of wavelength of incident light and the diameter values. Generally speaking, for the sake of measurement accuracy, a diameter of, e.g., up to the $40^{th}$-order ring beginning from the 0-order center-ring, needs to be measured. The above-described ring-counting calculating method is simple to implement and has a low cost. However, it is easy for an observer to make mistakes due to visual fatigue when counting the rings, and the automation degree is low for this method. Further, since a field range of the reading microscope is relatively small, it is not possible for the observer to see the entire interference fringe pattern, i.e., intuitiveness thereof is poor.

More commonly, a typical method for processing the interference fringe pattern is a fringe centerline method, and a processing flow thereof includes: 1) denoising the interference fringe pattern; 2) performing binarization and thinning on the denoised interference fringe pattern; 3) deriving a radius and a ring-center (i.e. a center of a ring) of the interference fringe by acquiring coordinate values of points on the thinned fringes; and 4) calculating a physical parameter of the unit to be measured, by using radius of two orders of bright or dark fringes and the wavelength of incident light. It can be seen that, as compared with the ring-counting calculating method, the fringe centerline method has a higher automation degree and a better intuitiveness.

SUMMARY

However, it is found through analysis that, although the fringe centerline method's automation degree is high, it is very sensitive to influence of noise in the processing procedure. Therefore, the estimation accuracy of the physical parameters of the unit to be measured significantly relies on the quality of the interference fringe pattern. For example, when an occlusion issue exists in the interference fringe pattern, the physical parameters cannot be estimated accurately.

In order to solve the above-described technical problem, the present disclosure is proposed. Embodiments of the present disclosure provide a physical parameter estimating method, a physical parameter estimating device, an electronic apparatus, a computer program product, and a computer-readable storage medium, by which physical parameters of the unit to be measured can be estimated with high accuracy even in presence of noise and obstacles in the interference fringe pattern.

According to one aspect of the present disclosure, there provides a physical parameter estimating method including: reading a Newton's rings fringe pattern obtained by performing an interferometric measurement on a unit to be measured; calculating a magnitude spectrum of an intensity distribution signal of at least one first-direction pixel set in the Newton's rings fringe pattern under each fractional Fourier transform (FRFT) order in a searching range of FRFT orders, the first-direction pixel set including a line of pixels in a first direction, the first direction being one of a row direction and a column direction of the Newton's rings fringe pattern; determining a matched order of the intensity distribution signal according to the calculated magnitude spectrums; and estimating a physical parameter involved in the interferometric measurement according to at least the matched order.

According to another aspect of the present disclosure, there provides a physical parameter estimating method comprising: reading a Newton's rings fringe pattern obtained by performing an interferometric measurement on a unit to be measured; downsampling the Newton's rings fringe pattern to obtain a downsampled Newton's rings fringe pattern; calculating a magnitude spectrum of an intensity distribution signal of at least one first-direction pixel set in the downsampled Newton's rings fringe pattern under each fractional Fourier transform (FRFT) order in a searching range of FRFT orders, the first-direction pixel set including a line of pixels in a first direction, the first direction being one of a row direction and a column direction of the downsampled Newton's rings fringe pattern; determining a matched order of the intensity distribution signal according to the calculated magnitude spectrums; and estimating a physical parameter involved in the interferometric measurement according to at least the matched order.

According to another aspect of the present disclosure, there provides a physical parameter estimating method including: reading an interference fringe pattern having a quadratic phase obtained by performing an interferometric measurement on a unit to be measured; calculating a first magnitude spectrum of an intensity distribution signal of at least one first-direction pixel set in the interference fringe pattern under each fractional Fourier transform (FRFT) order in a first searching range of FRFT orders, the first-direction pixel set including a line of pixels in a first direction, the first direction being one of a row direction and a column direction of the interference fringe pattern; determining a first matched order of the intensity distribution signal of the at least one first-direction pixel set according to the calculated first magnitude spectrums; calculating a second magnitude spectrum of an intensity distribution signal of at least one second-direction pixel set in the interference fringe pattern under each FRFT order in a second searching range of FRFT orders, the second-direction pixel set including a line of pixels in a second direction, the second direction being perpendicular to the first direction; determining a second matched order of the intensity distribution signal of the at least one second-direction pixel set according to the calculated second magnitude spectrums; and estimating a physical parameter involved in the interferometric measurement according to at least the first matched order and the second matched order.

According to another aspect of the present disclosure, there provides a physical parameter estimating device including: a fringe pattern reading unit for reading a Newton's rings fringe pattern obtained by performing an interferometric measurement on a unit to be measured; a magnitude spectrum calculating unit for calculating a magnitude spectrum of an intensity distribution signal of at least one first-direction pixel set in the Newton's rings fringe pattern under each fractional Fourier transform (FRFT) order in a searching range of FRFT orders, the first-direction pixel set including a line of pixels in a first direction, the first direction being one of a row direction and a column direction of the Newton's rings fringe pattern; a matched order determining unit for determining a matched order of the intensity distribution signal according to the calculated magnitude spectrums; and a physical parameter estimating unit for estimating a physical parameter involved in the interferometric measurement according to at least the matched order.

According to another aspect of the present disclosure, there provides a physical parameter estimating device including: a fringe pattern reading unit for reading an interference fringe pattern having a quadratic phase obtained by performing an interferometric measurement on a unit to be measured; a first magnitude spectrum calculating unit for calculating a first magnitude spectrum of an intensity distribution signal of at least one first-direction pixel set in the interference fringe pattern under each fractional Fourier transform (FRFT) order in a first searching range of FRFT orders, the first-direction pixel set including a line of pixels in a first direction, the first direction being one of a row direction and a column direction of the interference fringe pattern; a first matched order determining unit for determining a first matched order of the intensity distribution signal of the at least one first-direction pixel set according to the calculated first magnitude spectrums; a second magnitude spectrum calculating unit for calculating a second magnitude spectrum of an intensity distribution signal of at least one second-direction pixel set in the interference fringe pattern under each FRFT order in a second searching range of FRFT orders, the second-direction pixel set including a line of pixels in a second direction, the second direction being perpendicular to the first direction; a second matched order determining unit for determining a second matched order of the intensity distribution signal of the at least one second-direction pixel set according to the calculated second magnitude spectrums; and a physical parameter estimating unit for estimating a physical parameter involved in the interferometric measurement according to at least the first matched order and the second matched order.

According to another aspect of the present disclosure, there provides an electronic apparatus including: a processor; a memory; and computer program instructions stored in the memory that, when executed by the processor, cause the processor to perform the above-described physical parameter estimating method.

According to another aspect of the present disclosure, there provides a computer program product including computer program instructions that, when executed by a processor, cause the processor to execute the above-described physical parameter estimating method.

According to another aspect of the present disclosure, there provides a computer-readable storage medium with computer program instruction stored thereon that, when executed by a processor, cause the processor to perform the above-described physical parameter estimating method.

Compared to conventional methods, by adopting the physical parameter estimating method, the physical parameter estimating device, the electronic apparatus, the computer program product, and the computer-readable storage medium according to the embodiments of the present disclosure, there is no need to perform a denoising operation on the Newton's rings fringe pattern in advance in the procedure of estimation. Due to energy aggregation of chirp signals in the FRFT domain, various physical parameters involved in the interferometric measurement can be estimated simultaneously and with high accuracy even in presence of noise and obstacles in the Newton's rings fringe pattern. Moreover, the procedure of estimation is not influenced by human factors so that artificial errors are reduced.

BRIEF DESCRIPTION OF THE DRAWINGS

The above-described and other purposes, characteristics and advantages would become more apparent by describing embodiments of the present disclosure in more detail in combination with accompanying drawings. The accompanying drawings are intended to provide further understanding of the embodiments of the present disclosure and constitute a part of specification, and to explain the present disclosure together with the embodiments of the present disclosure, instead of constituting limitation to the present disclosure. In the drawings, similar reference numbers generally designate similar elements or steps.

DETAILED DESCRIPTION OF THE PREFERRED EMBODIMENT

Figure 1:
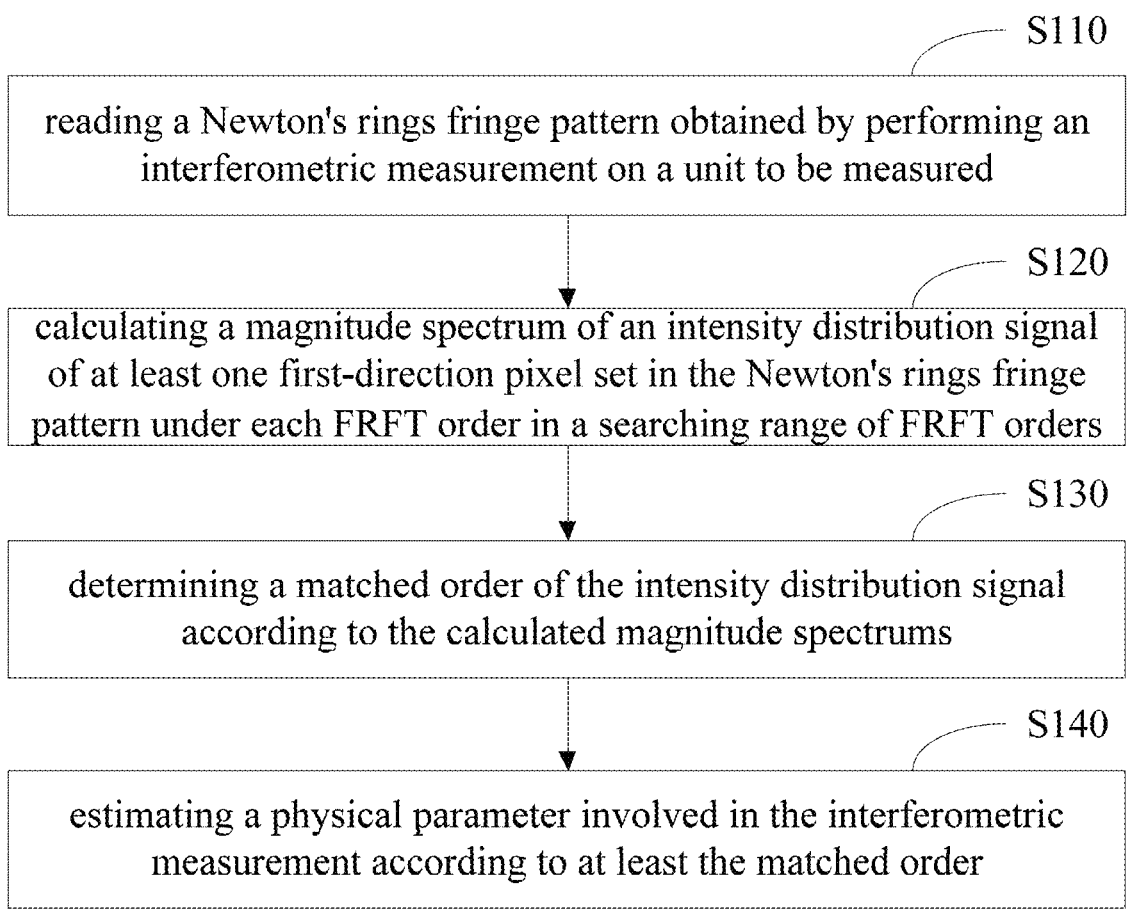
FIG. 1 illustrates a flow chart of a physical parameter estimating method according to a first embodiment of the present disclosure.

Hereinafter, exemplary embodiments according to the present disclosure are described in detail with reference to the accompanying drawings. It is obvious that the described embodiments are only a part of embodiments of the present disclosure but not all of the embodiments of the present disclosure. And, it should be understood that the present disclosure is not limited to the exemplary embodiments described herein.

Overview of the Present Disclosure

As a basic interference fringe pattern, a Newton's rings fringe pattern is often encountered in interferometric measurements. Curvature radius, vertex position, wavelength of incident light, refractive index of media, and other physical parameters related to a geometry route of a unit to be measured may be obtained by analyzing and processing the Newton's rings fringe pattern.

A existing and typical method for processing the Newton's rings fringe pattern is the fringe centerline method, and a processing flow thereof includes: reading the Newton's rings fringe pattern; performing pre-processing such as denoising the Newton's rings fringe pattern; performing binarization and thinning on the pre-processed Newton's rings fringe pattern to obtain "skeleton" lines of the original image, i.e., maximum values or minimum values of the fringe intensity; acquiring coordinate values of points on the thinned fringes (i.e., on the fringe centerlines having only a width of one pixel) and deriving radiuses and the center of the fringes by using the theorem that three points can determinate a circle; and finally, calculating curvature radius R of a surface to be measured from radiuses $r_k$ and $r_{k+m}$ of $k^{th}$-order and $(k+m)^{th}$-order dark fringes (where k and m are both natural numbers) and wavelength $\lambda_0$ of incident light by using the following equation (1):

$$R = \frac{r_{k+m}^2 - r_k^2}{m\lambda_0} \qquad (1)$$

The existing fringe centerline method has the following disadvantages: the denoising operation must be performed prior to extracting the skeleton lines because this algorithm is very sensitive to influence of noise in the processing procedure and the estimation accuracy significantly relies on the quality of the fringe pattern. When there is a certain amount of noise and obstacles in the Newton's rings fringe pattern, this algorithm cannot estimate the physical parameters of the unit to be measured with relative high accuracy.

In view of the above technical problem, it is found through analysis that, after being simplified, a mathematical expression of an intensity distribution signal of pixels in the Newton's rings fringe pattern has a form similar to that of a two-dimension (2-D) chirp signal. Fractional Fourier transform (FRFT) can be regarded as a generalization of Fourier transform (FT), and understood as a chirp-based decomposition. Accordingly, it is proposed in embodiments of the present disclosure that magnitude spectrums of the intensity distribution signal of the pixels in the Newton's rings fringe pattern are calculated in a FRFT domain, a FRFT matched order of the intensity distribution signal is determined by using energy aggregation of chirp signals in the FRFT domain, and a physical parameter of the unit to be measured is estimated according to the matched order.

In particular, the basic idea of the embodiments of the present disclosure is to provide a new physical parameter estimating method, physical parameter estimating device, electronic apparatus, computer program product, and computer-readable storage medium, in which a magnitude spectrum of an intensity distribution signal of at least one first-direction pixel set in a Newton's rings fringe pattern is calculated under each fractional Fourier transform (FRFT) order in a searching range of FRFT orders in the FRFT domain, the Newton's rings fringe pattern being obtained by performing an interferometric measurement on a unit to be measured; a matched order of the intensity distribution signal of the at least one first-direction pixel set is determined according to the magnitude spectrums calculated under each FRFT order; and a physical parameter involved in the interferometric measurement is estimated according to at least the matched order. Therefore, the FRFT-based physical parameter estimating method according to the embodiments of the present disclosure makes it possible to estimate physical parameters of the unit to be measured with high accuracy even in presence of noise and obstacles in the Newton's rings fringe pattern.

After introducing the basic principle of the present disclosure, various non-restrictive embodiments of the present disclosure will be described in detail with reference to accompanying drawings.

Exemplary Method

FIG. 1 illustrates a flow chart of a physical parameter estimating method according to a first embodiment of the present disclosure.

As shown in FIG. 1, a physical parameter estimating method according to the first embodiment of the present disclosure may include:

In step S110, a Newton's rings fringe pattern obtained by performing an interferometric measurement on a unit to be measured is read.

In step S120, a magnitude spectrum of an intensity distribution signal of at least one first-direction pixel set in the Newton's rings fringe pattern is calculated under each fractional Fourier transform (FRFT) order in a searching range of FRFT orders in a FRFT domain. The first-direction pixel set includes a line of pixels in a first direction, and the first direction is one of a row direction and a column direction of the Newton's rings fringe pattern.

In step S130, a matched order of the intensity distribution signal of the at least one first-direction pixel set is determined according to the magnitude spectrums calculated under each FRFT order.

In step S140, a physical parameter involved in the interferometric measurement is estimated according to at least the matched order.

Thus, it can be seen that, by adopting the physical parameter estimating method according to the first embodiment of the present disclosure, there is no need to perform a denoising operation on the Newton's rings fringe pattern in advance in the procedure of estimation. Due to energy aggregation of chirp signals in the FRFT domain, various physical parameters involved in the interferometric measurement can be estimated simultaneously and with high accuracy even in presence of noise and obstacles in the Newton's rings fringe pattern. Moreover, the procedure of estimation is not influenced by human factors so that artificial errors are reduced.

Hereinafter, the above steps will be described in more detail in some specific examples.

First, in step S110, Newton's rings fringe pattern obtained by performing an interferometric measurement on a unit to be measured can be acquired in various manners. The Newton's rings fringe pattern includes a series of concentric rings which are sparse on inner side and dense on outer side.

For example, the unit to be measured may be an optical device having a surface to be measured, and the Newton's rings fringe pattern may be generated by measuring the surface of the optical device with a conventional Newton interferometer. It should be appreciated that the present disclosure is not limited thereto. The unit to be measured may be various kinds of devices having parameters to be measured. For example, the unit to be measured may be a metal plate or the like, of which parameters such as deformation, displacement or the like need to be measured.

Figure 2A:
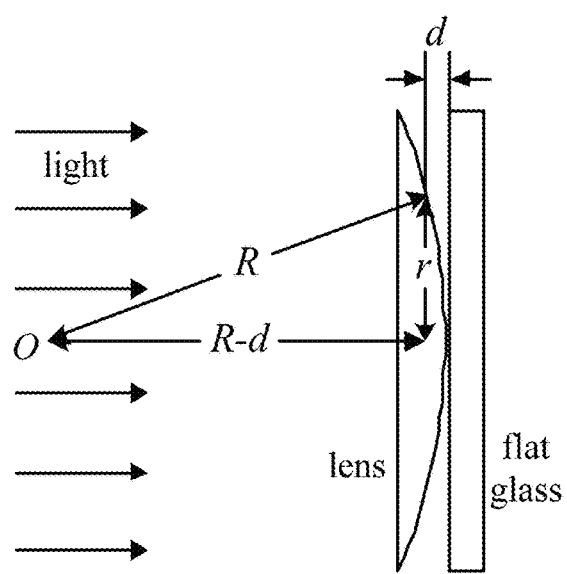
FIG. 2A illustrates a schematic diagram of a core optical path for generating a Newton's rings fringe pattern according to an embodiment of the present disclosure.
Figure 2B:
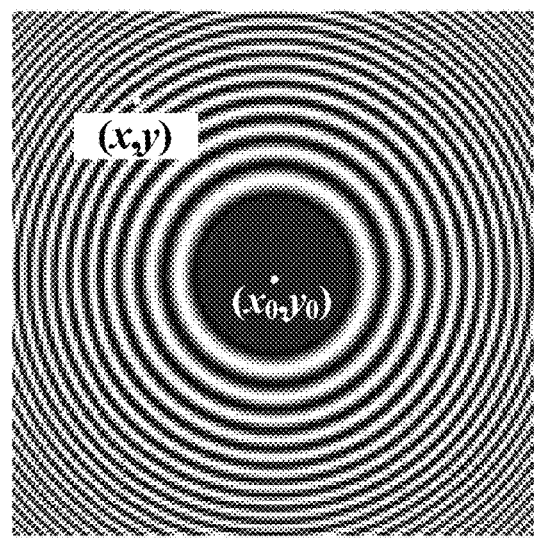
FIG. 2B illustrates a schematic diagram of the Newton's rings fringe pattern according to an embodiment of the present disclosure.

FIG. 2A illustrates a schematic diagram of a core optical path for generating a Newton's rings fringe pattern according to an embodiment of the present disclosure, and FIG. 2B illustrates a schematic diagram of the Newton's rings fringe pattern according to an embodiment of the present disclosure.

As shown in FIG. 2A, an optical device (for example, a plano-convex lens) can be placed on an optical flat glass, and a wedge-shaped gap is formed between a surface of the flat glass and a spherical surface to be measured of the plano-convex lens. The gap is filled with media having a predetermined refractive index $n_0$ (for example, air having the refractive index $n_0$ of 1). When monochrome light of a specific wavelength $\lambda_0$ is irradiated perpendicularly onto the optical device, interferometric fringes can be observed. These fringes are a series of concentric rings centering at the contacting point between the plano-convex lens and the flat glass, i.e., the Newton's rings, as shown in FIG. 2B.

Since diameters of the Newton's rings are too small to be observed and measured directly, a reading microscope can be used. For example, the Newton's rings can be imaged as an object onto an observing screen with a camera lens. This observing screen may be image sensors (for example, complementary metal-oxide semiconductor (CMOS) sensors or the like) on a camera, and each sensor is referred to as a pixel functioning to convert a light signal sensed on its area into an electrical signal. In turn, the electrical signals are converted by a coding circuit into a certain format of digital codes so as to be read into an electronic apparatus such as a computer for subsequent physical parameter estimating processing.

It should be appreciated that the present disclosure is not limited to using the Newton's interferometer to generate the Newton's rings fringe pattern for the unit to be measured. Any known or later-developed methods for generating and reading the Newton's rings fringe pattern can be applied in the physical parameter estimating method according to the embodiments of the present disclosure, and should be included in the protection scope of the present disclosure.

As shown in FIG. 2B, the Newton's rings fringe pattern is a classic example of fringe patterns having a quadratic phase, and the brightness or darkness of each pixel in the fringe pattern is a grayscale value of the fringe intensity. Moreover, it can be proved that the mathematical expression of the intensity distribution signal of the respective pixels in the Newton's rings fringe pattern can be simplified and demonstrated as a 2-D chirp signal. In particular, in the Newton's rings fringe pattern, a mathematical expression $f_N(x, y)$ of an intensity distribution signal at a position of a pixel (x, y) is shown in equation (2):

$$\begin{aligned} f_N(x, y) &= I_0 + I_1 \cos(\pi K r^2 + \pi) \\ &= I_0 + I_1 \cos[\pi K(x-x_0)^2 + \pi K(y-y_0)^2 + \pi] \\ &= I_0 + I_1 \cos[\varphi(x, y)] \end{aligned} \quad (2)$$

where $I_0$ is a background intensity of the Newton's rings fringe pattern, $I_1$ is an amplitude of a fringe at the position of the pixel (x, y), K is a chirp rate, $(x_0, y_0)$ are a coordinate set of a ring-center of the Newton's rings fringe pattern, r is a distance between the pixel (x, y) and the pixel $(x_0, y_0)$, and $\varphi(x, y)$ is a phase of the fringe at the position of the pixel (x, y).

Since there is a mapping relationship between the chirp rate K and the physical parameters to be estimated, and since there is also a mapping relationship between the chirp rate K and the FRFT matched order of the chirp signal, the physical parameters of the surface to be measured of the optical device can be estimated by using the FRFT matched order, which may be determined by performing a FRFT on the intensity distribution signal in the Newton's rings fringe pattern.

It can be seen from equation (2) that not only the fringe amplitude $I_1$ and the fringe phase $\varphi(x, y)$ which both form the chirp signal, but also a certain direct current (DC) component $I_0$ exist in the read Newton's rings fringe pattern. The FRFT is a chirp-based decomposition. Therefore, if the FRFT is carried out on the entire Newton's rings fringe pattern directly, there may be some errors in subsequent calculations.

Therefore, in an example of the present disclosure, in order to estimate the physical parameters accurately, the physical parameter estimating method may further include: after step S110, removing a background intensity $I_0$ from the Newton's rings fringe pattern.

The background intensity $I_0$ can be removed with various kinds of methods. For example, the background intensity (or referred to as the DC component) $I_0$ may be derived by determining an intensity value $f_N(x, y)$ of each pixel in the Newton's rings fringe pattern, summing them up and calculating the average value thereof, and then, the background intensity $I_0$ is subtracted at each pixel position in the Newton's rings fringe pattern, so as to implement the removing operation. Of course, the present disclosure is not limited thereto. For example, the above-described removing operation may be implemented by for example a fringe pattern normalization technique or the like.

In an example of the present disclosure, excepting the removing operation, the fringe intensity $I_1$ can also be removed from the Newton's rings fringe pattern (i.e. $I_1$ in the following relevant equation can be taken as an integer "1") to improve the processing precision. In the same way, the removing operation of the fringe intensity $I_1$ can be implemented by adopting various means. For example, the fringe intensity $I_1$ can be removed by means of a method of fringe pattern normalization. Of course, the present disclosure does not limit to it. For example, any other useable method can be applied to any embodiment of the present disclosure.

In practice applications, if the background intensity $I_0$ and/or the fringe intensity $I_1$ in the Newton's rings fringe pattern are constants respectively, they impose no effect on a FRFT analysis and may be not removed. When the background intensity $I_0$ and the fringe intensity $I_1$ are not constants, they impose an effect on the FRFT analysis, and at the same time, the background intensity $I_0$ and/or the fringe intensity $I_1$ can be removed by any manners such as the fringe pattern normalization.

In order to estimate physical parameters effectively, in addition to the step of removing the background intensity, the physical parameter estimating method may further include some other pre-processing steps. For example, in an example of the present disclosure, after removing the background intensity from the Newton's rings fringe pattern, the physical parameter estimating method may further include: converting the intensity distribution signal of the at least one first-direction pixel set in the background-intensity-removed Newton's rings fringe pattern from a real number form into a complex number form. Of course, the present disclosure is not limited thereto. Alternatively, in order to achieve a faster processing precision and processing speed, the FRFT may be carried out in a real number field directly. This may cause some dispersion (for example, a broadband signal with a low magnitude) at places other than the peak of the magnitude spectrum, and thus the dispersion signal and the peak signal need to be distinguished carefully in the subsequent process.

For example, to facilitate subsequent calculation, the intensity distribution signal of a part of pixels (e.g., one or more rows of pixels and/or one or more columns of pixels) or all pixels in the Newton's rings fringe pattern can be converted from the real number distribution to the complex number distribution. The real-to-complex conversion operation can by carried out in various manners. For example, it can be seen from equation (2) that, after removing the DC component $I_0$, the intensity distribution signal of the Newton's rings fringe pattern is a Cosine function, thus, $\varphi(x, y)$ can be derived simply by using an inverse cosine function acos( ). Then, the derived $\varphi(x, y)$ is converted from the real number form into the corresponding complex number form, as expressed in the following equation (3):

$$f_N(x, y) = I_1 \exp[\varphi(x, y)] \qquad (3)$$
$$= I_1 \exp[j\pi K(x - x_0)^2 + j\pi K(y - y_0)^2 + j\pi]$$
$$= I_1 \exp(j\pi K r^2 + j\pi)$$

Of course, the present disclosure is not limited thereto. For example, the real-to-complex conversion operation can be implemented by using a Hilbert transform.

Further, it is known according to definition of the FRFT that a range of values of the FRFT order p is 0<|p|<2. In the subsequent FRFT, if the range of values of the FRFT order p is too wide and too dense, the calculation amount may be too high; if the range of values of the FRFT order p is too narrow, the matched order may not be included therein; and if the range of values of the FRFT order p is too sparse, the matched order may have errors.

Therefore, in an embodiment of the present disclosure, in order to make a tradeoff between calculation amount and calculation accuracy of the matched order, the physical parameter estimating method may further include: before step S120, estimating a searching range of FRFT orders. In particular, the step of estimating a searching range of FRFT orders may include: determining ranges of at least some parameters (for example, refractive index $n_0$ of media, wavelength) $\lambda_0$ of incident light, and curvature radius R of the surface to be measured of the optical device) among physical parameters involved in the interferometric measurement according to environment and requirement of the interferometric measurement; determining a value range of a FRFT order according to the ranges of the at least some parameters; and dividing the value range with a proper step size to determine the searching range of FRFT orders.

For example, in the scenario as shown in FIG. 2A, typically, the radius of a spherical surface to be measured of a plano-convex lens is between 0.5 m and 2 m, and the refractive index of air is 1, the wavelength of monochrome incident light is constant (for example, the wavelength of light from a sodium yellow light is 589.3 nm). A value range of the FRFT order p can be roughly estimated as being between $-4e^{-7}$ to $-1e^{-7}$ by using the above parameter values and the mapping relationship between the physical parameters to be estimated and the matched orders. Further, it can be known from experience that a good accuracy of the matched order can be obtained with a step size of one thousandth of the value range. Thus, 1000 specific values $p_1$ to $p_{1000}$ of the FRFT orders are obtained.

Next, in step S120, a magnitude spectrum of an intensity distribution signal of pixels in the Newton's rings fringe pattern can be calculated under each FRFT order in the searching range of FRFT orders, to determine the FRFT matched order of the intensity distribution signal of the pixels.

It can be found through further analysis of the Newton's rings fringe pattern as shown in FIG. 2B that an intensity distribution signal of pixels in each row or each column of the Newton's rings fringe pattern can be regarded as a one-dimension (1-D) chirp signal. In particular, a mathematical expression of the complex number form of the intensity distribution signal of pixels in each row is shown in equation (4):

$$f_N(x) = I_1 \exp[j\pi K x^2 + j2\pi f_{cen} x + j\phi_y] \quad (4)$$

and a mathematical expression of the complex number form of the intensity distribution signal of pixels in each column is shown in equation (5):

$$f_N(y) = I_1 \exp[j\pi K y^2 + j2\pi f_{cen} y + j\phi_x] \quad (5)$$

where $f_{cen}$ is a center frequency, $\phi_y$ is a fixed phase of a certain row of the Newton's rings fringe pattern, and $\phi_x$ is a fixed phase of a certain column of the Newton's rings fringe pattern.

It can be seen from equation (4) and equation (5) that pixels in each row and each column of the Newton's rings fringe pattern can be respectively regarded as the 1-D chirp signal and have the same distribution, that is, all of the rows and columns have the same chirp rate K, and thus they have the same matched order or matched rotation angle. In this case, the issue of determining the FRFT matched order of the intensity distribution signal of the respective pixels in the Newton's rings fringe pattern can be simplified as follows: determining the FRFT matched order of an intensity distribution signal of one row or column of pixels in the Newton's rings fringe pattern only by calculating the magnitude spectrum of the one row or column of pixels in the Newton's rings fringe pattern within the search range of FRFT orders in the 1-D FRFT domain, thereby obtaining the chirp rate K to be used in the following physical parameter estimation.

Therefore, in the first example, in order to increase the speed for estimating the physical parameters, step S120 may include: performing a one-dimension (1-D) FRFT on an intensity distribution signal of any one first-direction pixel set under each FRFT order in the searching range of FRFT orders, to obtain a 1-D magnitude spectrum of the intensity distribution signal of the one first-direction pixel set under each FRFT order, the first-direction pixel set includes a line of pixels in a first direction, and the first direction is one of a row direction and a column direction of the Newton's rings fringe pattern.

For example, a first order $p_1$ is selected from the FRFT orders $p_1$ to $p_{1000}$, and the 1-D FRFT of the intensity distribution signal of any one row or column of pixels in the Newton's rings fringe pattern can be derived under this order $p_1$ by using the FRFT equation. Hereinafter, for convenience, an example in which the 1-D FRFT is performed on a row of pixels is described. It is obvious that the present disclosure can be similarly applied to a case of a column of pixels.

In particular, a definition of the FRFT equation is expressed in equation (6):

$$F_\alpha(u) = \int_{-\infty}^{\infty} K_\alpha(u, x) f(x) dx \quad (6)$$

where $f_N(x)$ is an intensity distribution signal of respective pixels in a certain row of the Newton's rings fringe pattern, $\alpha$ is a rotation angle in the time-frequency plane, and $K_\alpha(u, x)$ is a kernel function of the FRFT, which is defined as:

$$K_\alpha(u, x) = \begin{cases} B_\alpha \exp[j\pi(\cot\alpha u^2 - 2\csc\alpha ux + \cot\alpha x^2)], & \alpha \neq n\pi, \\ \delta(u - x), & \alpha = 2n\pi, \\ \delta(u + x), & \alpha = 2n\pi \pm \pi, \end{cases}$$

where $$\alpha = \frac{p}{2}\pi,$$

$0 < |p| < 2$, $n \in Z$, and $B_\alpha = \sqrt{1 - j\cot\alpha}$, $B\alpha$ is a variable related to the rotation angle.

Thus, a first rotation angle $\alpha_1$ can be calculated according to the first order $p_1$. Then, the intensity distribution signal $f_N(i)$ (including 512 elements of $f_N(i, 1)$, $f_N(i, 2)$, ..., $f_N(i, 512)$) of the i-th row (i is a natural number and $1 \leq i \leq 512$) of pixels in the Newton's rings fringe pattern (for convenience, a resolution thereof is assumed as 512 rows×512 columns) is substituted into equation (6) to calculate the 1-D FRFT under the first rotation angle $\alpha_1$, so as to obtain the 1-D magnitude spectrum of the intensity distribution signal $f_N(i)$ of the i-th row of pixels under the first rotation angle $\alpha_1$. Next, a second rotation angle $\alpha_2$ can be calculated according to the second order p2. Then, the 1-D FRFT of the intensity distribution signal $f_N(i)$ of the i-th row of pixels under the second rotation angle $\alpha_2$ is calculated, to obtain the 1-D magnitude spectrum of the intensity distribution signal $f_N(i)$ of the i-th row of pixels under the second rotation angle $\alpha_2$. These operations are repeated until the 1-D magnitude spectrum of the intensity distribution signal $f_N(i)$ of the i-th row of pixels under the last rotation angle $\alpha_{1000}$ is obtained.

Then, in step S130, after obtaining all of the 1-D magnitude spectrums for a certain row of pixels or a certain column of pixels under each FRFT order, it may be detected whether the row or the column reaches a peak of the 1-D magnitude spectrum after the FRFT. If the peak is reached, it means that the rotation angle is matched with the chirp rate K of the intensity distribution signal of the row/column.

Figure 3:
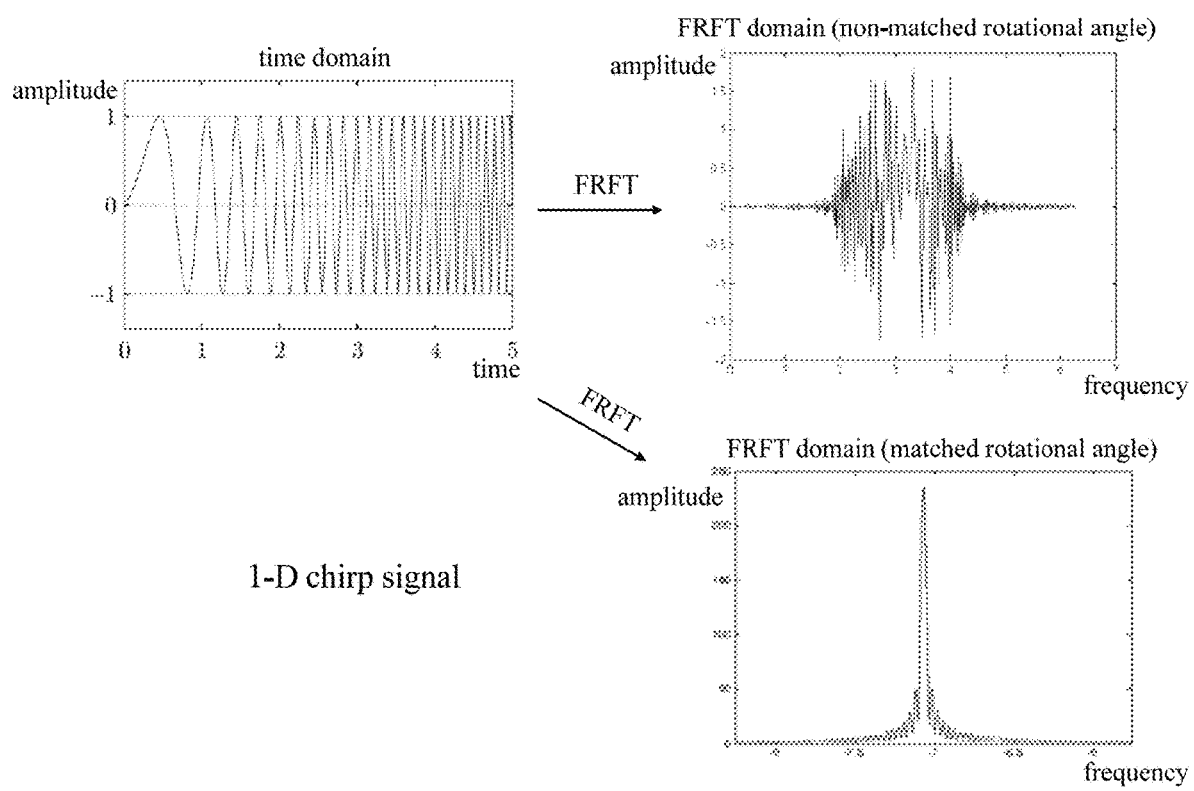
FIG. 3 illustrates a schematic diagram of performing a one-dimension (1-D) fractional Fourier transform (FRFT) on a 1-D chirp signal according to an embodiment of the present disclosure.

FIG. 3 illustrates a schematic diagram of performing a one-dimension (1-D) fractional Fourier transform (FRFT) on a 1-D chirp signal according to an embodiment of the present disclosure.

As shown in FIG. 3, due to the energy aggregation of chirp signals in the FRFT domain, when the FRFT of the 1-D chirp signal is calculated under different FRFT orders p (or rotation angles $\alpha$), if the FRFT order p is the matched order (or the rotation angle $\alpha$ is the matched rotation angle), a peak with a very high amplitude value appears at a position of a first coordinate in the 1-D magnitude spectrum, as shown in a bottom right diagram in FIG. 3; and if the FRFT order p is not the matched order (or the rotation angle $\alpha$ is not the matched rotation angle), low amplitude values are scatteredly distributed in almost entire FRFT domain, as shown in a top right diagram in FIG. 3.

According to the above characteristic, the step S130 may include: with respect to the one first-direction pixel set, determining a magnitude peak of each of the 1-D magnitude spectrums for the first-direction pixel set; finding a 1-D magnitude spectrum having a maximum magnitude peak among the 1-D magnitude spectrums for the first-direction pixel set; and determining a FRFT order corresponding to the 1-D magnitude spectrum having the maximum magnitude peak as the matched order.

For example, the matched order $p_k$ (k is a natural number and $1 \leq k \leq 1000$) can be obtained by finding a maximum value in 1000 1-D magnitude spectrums of the intensity distribution signal $f_N(i)$ of the i-th row of pixels under all of the FRFT orders $p_1$ to $p_{1000}$ calculated in Step S120.

Since the above operation requires storing a large amount of magnitude values, it needs a massive storage capacity. So, in order to save storage space, only the maximum value of the magnitude spectrums obtained after current comparison and its coordinate in the FRFT domain are stored, and subsequent amplitude values are compared therewith continuously. If the subsequent amplitude value is larger, the maximum value and its coordinate stored are updated, and otherwise, the comparison is continued.

At last, in step S140, after determining the matched order of the intensity distribution signal of the certain row or column of pixels, various physical parameters, such as curvature radius, vertex position, wavelength of incident light, refractive index of media, deformation, displacement or the like, of the unit can be obtained based on at least the matched order.

In one example, in case that the unit to be measured is an optical device having a surface to be measured, the step S140 may include: calculating one of three physical parameters used in the interferometric measurement according to the matched order in response to knowing the other two physical parameters, the three physical parameters including a refractive index of media, a wavelength of incident light, and a curvature radius of the surface to be measured.

Specifically, a mapping relationship between the matched rotation angle and the matched order is expressed in equation (7):

$$\alpha = \frac{p}{2}\pi \qquad (7)$$

A mapping relationship between the chirp rate K and the matched order of the intensity distribution signal of a certain row or column of pixels is expressed in equation (8):

$$\cot\alpha = \cot\left(\frac{p}{2}\pi\right) = -K \qquad (8)$$

A mapping relationship between the chirp rate K and the physical parameters involved in the interferometric measurement is expressed in equation (9):

$$\frac{2\pi n_0}{\lambda_0 R} = \pi K \qquad (9)$$

where $n_0$ is the refractive index of media, $\lambda_0$ is the wavelength of incident light, and R is the curvature radius of the surface to be measured of the optical device.

The below equation (10) can be obtained by combining equation (7) to equation (9):

$$R = -\frac{2n_0}{\lambda_0 \cot\alpha} = -\frac{2n_0}{\lambda_0 \cot\left(\frac{p}{2}\pi\right)} \qquad (10)$$

Thus, in case that the refractive index of media, the wavelength of incident light, and the matched order (or the matched rotation angle) are known, the curvature radius of the surface can be obtained.

Since the vertex position of the surface to be measured is desired to be obtained in addition to the curvature radius, in another example, the step S140 may include: determining a first coordinate of the maximum magnitude peak in the 1-D FRFT domain; and determining a first-direction coordinate of a ring-center of the Newton's rings fringe pattern according to the matched order and the first coordinate, the first-direction coordinate being a coordinate in the first direction.

In particularly, a mapping relationship between the coordinate set of the ring-center of the Newton's rings fringe pattern and the coordinate set of maximum magnitude peak in the 1-D FRFT domain is expressed in equation (11) and equation (12):

$$x_0 = u_{x0}\sec\alpha \qquad (11)$$

$$y_0 = u_{y0}\sec\alpha \qquad (12)$$

where $u_{x0}$ is a first coordinate of the magnitude peak of the 1-D magnitude spectrum of the intensity distribution signal of a certain row of pixels in the Newton's rings fringe pattern under the matched order, and $u_{y0}$ is a second coordinate of the magnitude peak of the 1-D magnitude spectrum of the intensity distribution signal of a certain column of pixels in the Newton's rings fringe pattern under the matched order.

Since the first coordinate $u_{x0}$ of the magnitude peak of the 1-D magnitude spectrum of the intensity distribution signal of the i-th row of pixels under the matched order is found in step S130, a first-direction coordinate (for example, X-axis coordinate) of the ring-center of the Newton's rings fringe pattern can be obtained according to the equation (11). Then, a first-direction coordinate (for example, X-axis coordinate) of the vertex position of the surface to be measured in a projecting plane can be obtained according to the first-direction coordinate of the ring-center.

In a further example, in order to obtain the entire position coordinates of the ring-center of the Newton's rings fringe pattern, the step S140 may further include: performing the 1-D FRFT on an intensity distribution signal of a second-direction pixel set in the Newton's rings fringe pattern under the matched order, to obtain a 1-D magnitude spectrum for the second-direction pixel set, the second-direction pixel set including a line of pixels in a second direction, the second direction being perpendicular to the first direction; determining a second coordinate of a magnitude peak of the 1-D magnitude spectrum for the second-direction pixel set in the 1-D FRFT domain; and determining a second-direction coordinate of the ring-center of the Newton's rings fringe pattern according to the matched order and the second coordinate, the second-direction coordinate being a coordinate in the second direction.

As described above, since rows and columns in the Newton's rings fringe pattern vary in the same way, that is, the matched rotation angles corresponding to all of the rows and columns are the same, the 1-D magnitude spectrum of the intensity distribution signal $f_N(h)$ of the h-th column (h is a natural number and 1 is a n) of pixels under the matched order $p_k$ can be calculated directly, and the maximum magnitude value and its second coordinate $u_{y0}$ are found in the 1-D magnitude spectrum through comparison, and a second-direction coordinate (for example, Y-axis coordinate) of the ring-center of the Newton's rings fringe pattern is obtained by substituting the second coordinate $u_{y0}$ into equation (12). Then, a second-direction coordinate (for example, Y-axis coordinate) of the vertex position of the surface to be measured in the projecting plane can be obtained according to the second-direction coordinate of the ring-center.

Thus it can be seen that, in the first example of the first embodiment of the present disclosure, in order to obtain a fast physical parameter estimating speed, the matched order can be determined by performing the 1-D FRFT on the intensity distribution signal of any one row or column of pixels respectively under each FRFT order in the searching range of FRFT orders with respect to the one row or column of pixels, and various physical parameters involved in the interferometric measurement can be estimated by using information such as the matched order and the position at which the magnitude peak thereof appears. Thus, a fast physical parameter estimating operation can be achieved.

However, in the first example, when there is noise or obstacles in the selected one row or column of pixels, the 1-D magnitude spectrum obtained based on the row or column of pixels will have errors, and thus an accurate physical parameter estimation may not be obtained.

In order to address the above problem, it is proposed in a second example that 1-D magnitude spectrums and matched orders can be obtained with respect to a plurality of rows or columns of pixels, and a final matched order can be determined based on a mathematical averaging of the obtained matched orders. It can be seen that this can improve estimation accuracy to a certain extent meanwhile ensuring the fast physical parameter estimation.

Therefore, in the second example, in order to balance speed and accuracy of the physical parameter estimation, after reading the Newton's rings fringe pattern in step S110, step S120 may include: with respect to each first-direction pixel set of the plurality of first-direction pixel sets, performing a 1-D FRFT on an intensity distribution signal of the first-direction pixel set respectively under each FRFT order in the searching range of FRFT orders, to obtain a 1-D magnitude spectrum of the intensity distribution signal of the first-direction pixel set under each FRFT order. Correspondingly, the step S130 may include: with respect to each first-direction pixel set of the plurality of first-direction pixel sets, determining a magnitude peak of each of the 1-D magnitude spectrums for the first-direction pixel set; finding a 1-D magnitude spectrum having a maximum magnitude peak among the 1-D magnitude spectrums for the first-direction pixel set; and determining a FRFT order corresponding to the 1-D magnitude spectrum having the maximum magnitude peak as a matched order for the first-direction pixel set; and determining the matched order of the intensity distribution signal by averaging the matched orders for the plurality of first-direction pixel sets.

For example, a plurality of rows or columns of pixels can be selected arbitrarily from the Newton's rings fringe pattern, and operations which are the same as those in step S120 and S130 in the first example are performed with respect to each of the plurality of rows or column of pixels, to obtain the matched order of each row or column of pixels, and an average value of the matched orders of the plurality of rows or columns of pixels obtained is calculated. Hereinafter, for convenience, an example in which the 1-D FRFT is performed on rows of pixels is described. It is obvious that the present disclosure can be similarly applied to a case of columns of pixels.

Specifically, with respect to a first row of pixels in a set of rows of pixels selected, in step S120, a 1-D magnitude spectrum of the intensity distribution signal of the first row of pixels under all of rotation angles $\alpha_1$ to $\alpha_{1000}$ are obtained; in step S130, the matched order of the first row of pixels is obtained by finding a maximum value of the 1000 1-D magnitude spectrums of the intensity distribution signal of the first row of pixels under all of the FRFT orders $p_1$ to $p_{1000}$. Then, above-described operations are repeated with respect to a second row of pixels in the set of rows of pixels selected, to obtain the matched order of the second row of pixels. The above-described operations are repeated until the matched order of a last row of pixels in the set of rows of pixels selected is obtained. Finally, the matched order of the intensity distribution signals of the set of rows of pixels selected is determined by averaging the matched orders of all of the rows of pixels in the set of rows of pixels.

Next, in step S140, after determining the matched order of the intensity distribution signals of certain several rows or columns of pixels, various physical parameters, such as curvature radius, vertex position, wavelength of incident light, refractive index of media, deformation, displacement or the like, of the unit can be obtained based on at least the matched order. Since step S140 is the same as that in the first example, the detailed description thereof is omitted here.

Thus it can be seen that, in the second example of the first embodiment of the present disclosure, in order to balance the speed and the accuracy of the physical parameter estimation, the matched order can be determined by performing the 1-D FRFT on the intensity distribution signals of a plurality of (or all of) rows or columns of pixels respectively under each FRFT order in the searching range of FRFT orders with respect to the plurality of (or all of) rows or columns of pixels, and various physical parameters involved in the interferometric measurement can be estimated by using average value of information such as the plurality of matched orders and the positions at which the magnitude peaks thereof appear. Thus, the accuracy of the physical parameter estimation is improved to a certain extent.

However, in the second example, since the rows or columns of pixels selected are still limited, when there is noise or obstacles in all of the rows or columns of pixels selected (for example, a large area is blocked in the Newton's rings fringe pattern due to stain existing in the optical path during the interferometric measurement), the 1-D magnitude spectrum obtained based on the several rows or columns of pixels will have errors, and thus subsequent physical parameter estimation will still have errors even with mathematical average performed.

In order to address the above problem, it is proposed in the third example that a 2-D magnitude spectrum of the entire Newton's rings fringe pattern can be obtained and the matched order can be derived based on the 2-D magnitude spectrum. This can make the subsequent physical parameter estimation less sensitive to the noise and obstacles in the Newton's rings fringe pattern, and physical parameters can be estimated effectively even when there is a large amount of noise and obstacles in the Newton's rings fringe pattern.

Therefore, in the third example, in order to further improve the accuracy of the physical parameter estimation, after reading the Newton's rings fringe pattern in step S110, step S120 may include: performing a two-dimension (2-D) FRFT on the Newton's rings fringe pattern under each FRFT order in the searching range of FRFT orders, to obtain a 2-D magnitude spectrum of the Newton's rings fringe pattern under each FRFT order.

Specifically, due to separability of the 2-D FRFT kernel function, performing the 2-D FRFT on a Newton's rings fringe pattern includes performing a 1-D FRFT on all rows of pixels (or row vectors) in the Newton's rings fringe pattern and then performing the 1-D FRFT on all column vectors of an intermediate result image generated by the first 1-D FRFT transform; or on the contrary, performing a 1-D FRFT on all columns of pixels (or column vectors) in the Newton's rings fringe pattern and then performing the 1-D FRFT on all row vectors of an intermediate result image generated by the first 1-D FRFT transform. Hereinafter, the 2-D FRFT is described in detail in one example.

Figure 4:
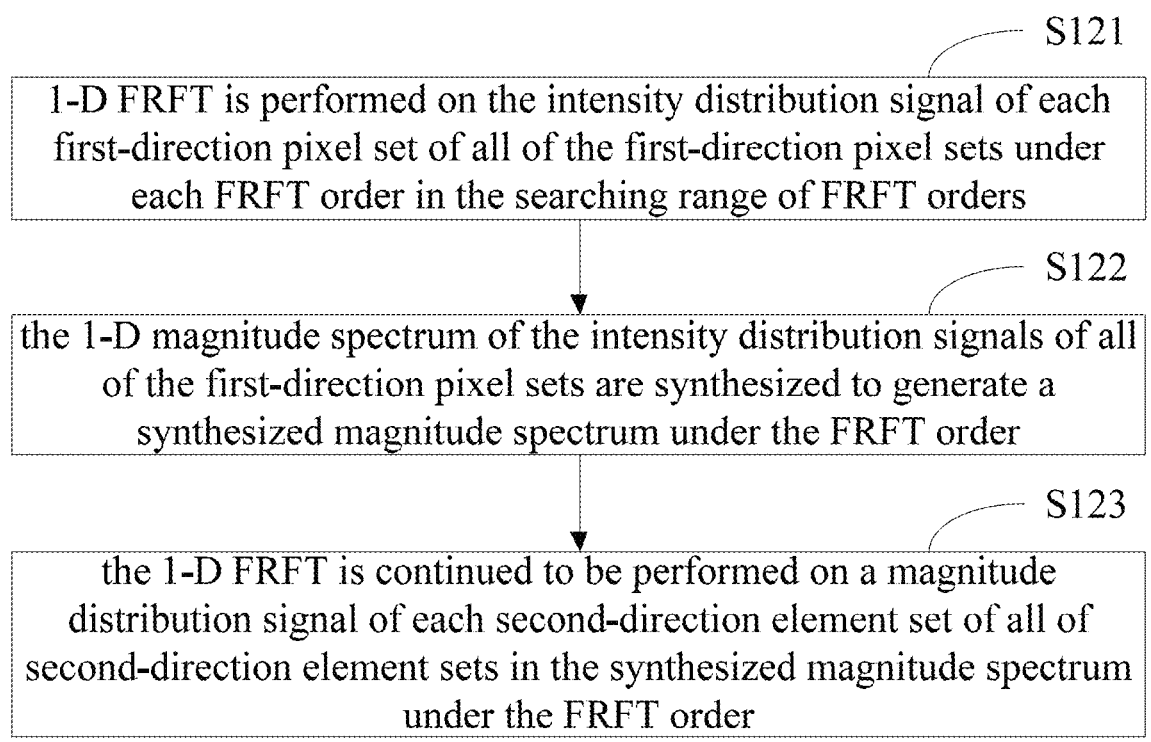
FIG. 4 illustrates a flow chart of a step of performing a two-dimension (2-D) FRFT according to an embodiment of the present disclosure.

FIG. 4 illustrates a flow chart of a step of performing a two-dimension (2-D) FRFT on a Newton's rings fringe pattern according to an embodiment of the present disclosure.

As shown in FIG. 4, step S120 may include:

In sub-step S121, a one-dimension (1-D) FRFT is performed on the intensity distribution signal of each first-direction pixel set of all of the first-direction pixel sets under each FRFT order in the searching range of FRFT orders, to obtain a 1-D magnitude spectrum of the intensity distribution signal of the first-direction pixel set under the FRFT order.

For example, a first order $p_1$ is selected from the FRFT orders $p_1$ to $p_{1000}$, and a first rotation angle $\alpha_1$ is calculated according to the first order $p_1$, and the 1-D FRFT of the intensity distribution signal of each row or column of pixels in the Newton's rings fringe pattern under the rotation angle $\alpha_1$ is derived by using the FRFT equation. Hereinafter, for convenience, an example in which the 1-D FRFT is firstly performed on rows of pixels is described. It is obvious that the present disclosure can be similarly applied to a case in which the 1-D FRFT is firstly performed on columns of pixels.

For example, first, the 1-D FRFT of the intensity distribution signal of the first row of pixels under the rotation angle $\alpha_1$ is calculated, to obtain the 1-D magnitude spectrum of the intensity distribution signal of the first row of pixels under the rotation angle $\alpha_1$. Then, the 1-D FRFT of the intensity distribution signal of the second row of pixels under the rotation angle $\alpha_1$ is calculated, to obtain the 1-D magnitude spectrum of the intensity distribution signal of the second row of pixels under the rotation angle $\alpha_1$. The above-described operations are repeated until the 1-D magnitude spectrum of the intensity distribution signal of the last row of pixels under the rotation angle $\alpha_1$ is obtained. For example, the magnitude spectrum of the intensity distribution signal of a certain row of pixels in the Newton's rings fringe pattern in the 1-D FRFT domain is shown on the right side of FIG. 3 (top and bottom figures correspond to cases of unmatching and matching respectively)

In sub-step S122, the 1-D magnitude spectrum of the intensity distribution signals of all of the first-direction pixel sets are synthesized to generate a synthesized magnitude spectrum under the FRFT order.

For example, the 1-D magnitude spectrums of each row of pixels under the rotation angle $\alpha_1$ are put together in order of rows of pixels to form an image of the 2-D magnitude spectrum as the synthesized magnitude spectrum.

In sub-step S123, the 1-D FRFT is continued to be performed on a magnitude distribution signal of each second-direction element set of all of second-direction element sets in the synthesized magnitude spectrum respectively under the FRFT order, to obtain the 2-D magnitude spectrum of the intensity distribution signals of all of the pixel sets in the Newton's rings fringe pattern in a 2-D FRFT domain under the FRFT order (i.e. the 2-D magnitude spectrum of the Newton's rings fringe pattern in the 2-D FRFT domain under the FRFT order). The second-direction element set includes a line of elements in a second direction, and the second direction is perpendicular to the first direction.

For example, the 1-D FRFT may be performed once again on column vectors in the intermediate result image obtained in the sub-step S122 under the rotation angle $\alpha_1$, to achieve the 2-D FRFT of the Newton's rings fringe pattern under the rotation angle $\alpha_1$.

Next, a second order $p_2$ is selected, and a second rotation angle $\alpha_2$ is calculated according to the second order $p_2$, and then the above sub-steps S121 to S123 are repeated to obtain the 2-D FRFT of the Newton's rings fringe pattern under the rotation angle $\alpha_2$. The above-described operations are repeated until the 2-D FRFT of the Newton's rings fringe pattern under the rotation angle $\alpha_{1000}$ is obtained.

In the third example, next, step S130 may include: determining a magnitude peak of each of the 2-D magnitude spectrums under each FRFT order for all of the pixel sets in the Newton's rings fringe pattern; finding a 2-D magnitude spectrum having a maximum magnitude peak among the 2-D magnitude spectrums for all of the pixel sets in the Newton's rings fringe pattern; and determining a FRFT order corresponding to the 2-D magnitude spectrum having the maximum magnitude peak as the matched order of the intensity distribution signals of all pixel sets in the Newton's rings fringe pattern (i.e. a matched order of the Newton's rings fringe pattern).

In other words, after obtaining all of the 2-D magnitude spectrums of the entire Newton's rings fringe pattern under each FRFT order, it may be detected whether the Newton's rings fringe pattern reaches a peak of the 2-D magnitude spectrum after FRFT. If the peak is reached, it means that the rotation angle is matched with the chirp rate K of the intensity distribution signals of the Newton's rings fringe pattern.

Figure 5:
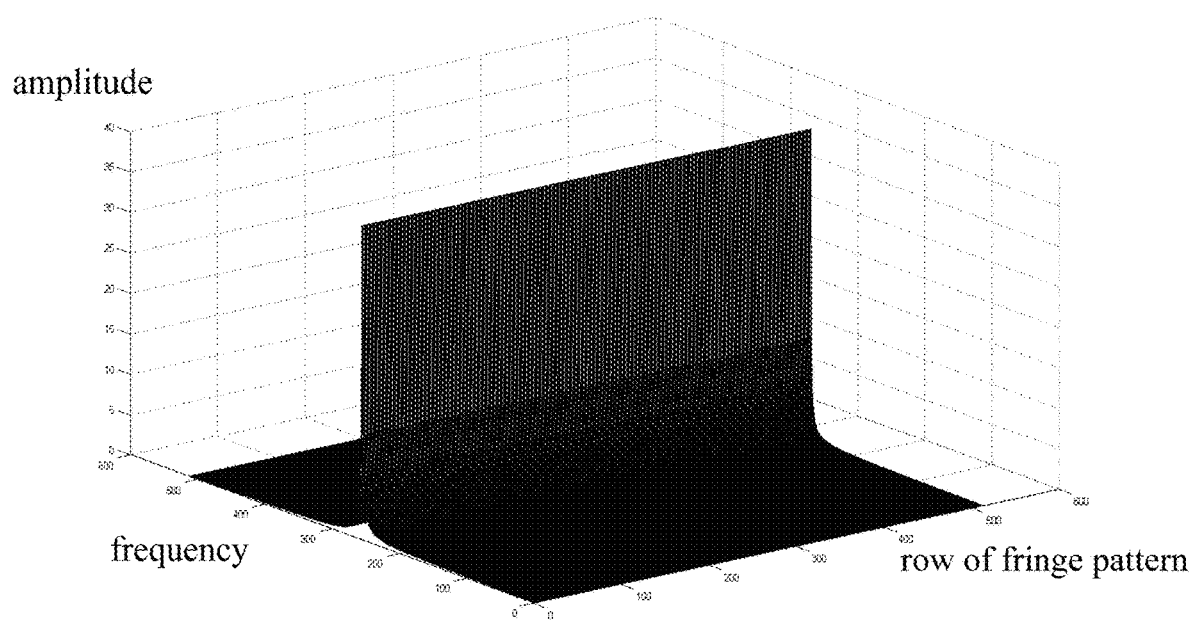
FIG. 5 illustrates a schematic diagram of a synthesized magnitude spectrum of all rows of pixels in the Newton's rings fringe pattern under a FRFT matched order according to an embodiment of the present disclosure.

FIG. 5 illustrates a schematic diagram of a synthesized magnitude spectrum of all rows of pixels in the Newton's rings fringe pattern under a FRFT matched order according to an embodiment of the present disclosure.

As shown in FIG. 5, in the image of the 2-D magnitude spectrum subjected to the 1-D FRFT once under the matched order, a series of sinc signals appear. It is equivalent to a 2-D magnitude spectrum obtained by combining the 1-D magnitude spectrums under the matched rotation angle as shown in FIG. 3 in order of rows of pixels. In the 2-D magnitude spectrum, horizontal axis shows numbers of the rows of pixels in the Newton's rings fringe pattern, and vertical axis shows coordinates of the FRFT domain. In order to facilitate the subsequent FRFT and the parameter estimation, coordinates of the FRFT domain in the 2-D magnitude spectrum may be divided to make the coordinates equal to the number of the columns of pixels in the fringe pattern.

Figure 6A:
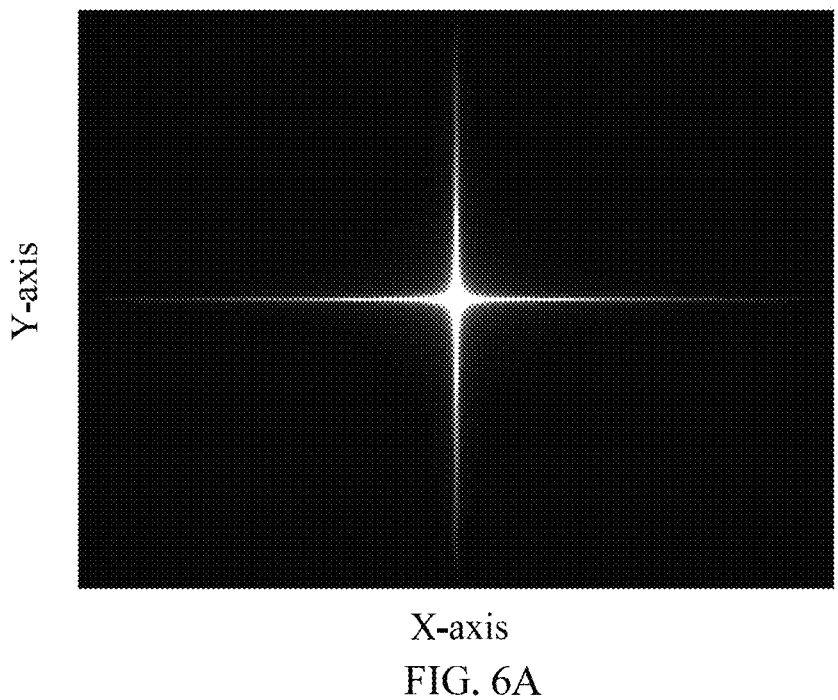
FIG. 6A illustrates a two-dimension (2-D) schematic diagram of a 2-D magnitude spectrum of the Newton's rings fringe pattern under a FRFT matched order according to an embodiment of the present disclosure.
Figure 6B:
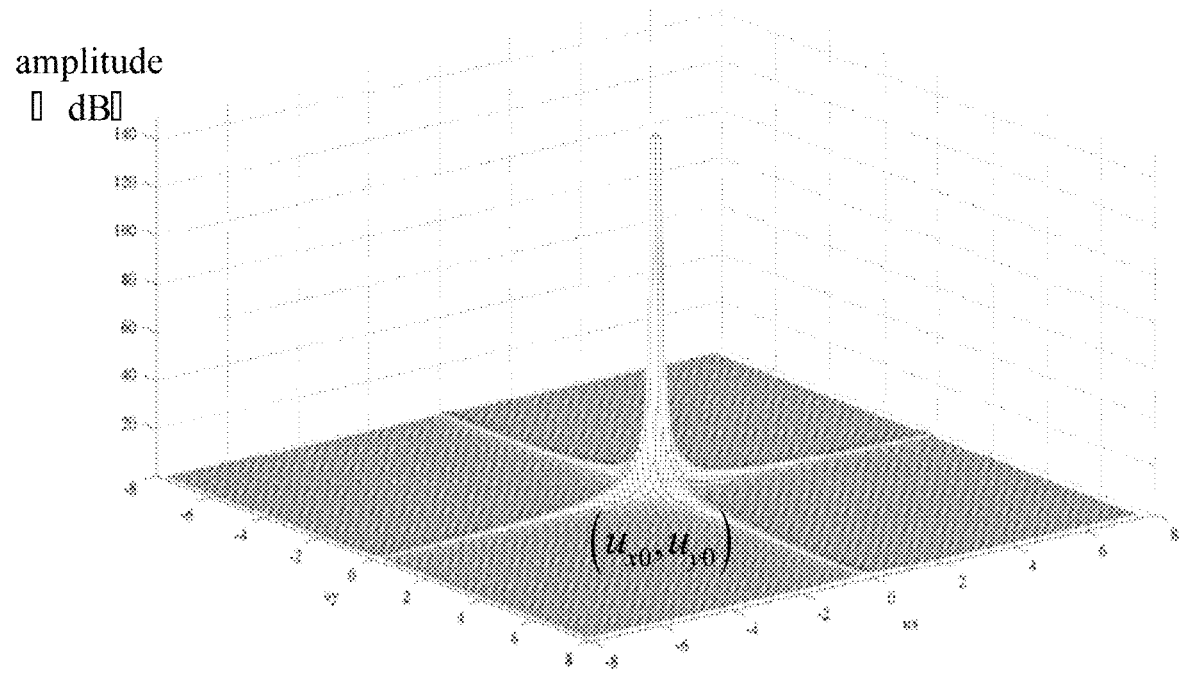
FIG. 6B illustrates a three-dimensional (3-D) schematic diagram of the 2-D magnitude spectrum of the Newton's rings fringe pattern under the FRFT matched order according to an embodiment of the present disclosure.

FIG. 6A illustrates a two-dimension (2-D) schematic diagram of a 2-D magnitude spectrum of the Newton's rings fringe pattern under a FRFT matched order according to an embodiment of the present disclosure, and FIG. 6B illustrates a three-dimensional (3-D) schematic diagram of the 2-D magnitude spectrum of the Newton's rings fringe pattern under the FRFT matched order according to an embodiment of the present disclosure.

As shown in FIG. 6A, it can be seen from a 2-D view that the center of the 2-D magnitude spectrum is the brightest, which corresponds to a signal with the maximum amplitude, and then the brightness gradually fades out towards periphery thereof along X-axis and Y-axis, which constitutes a 2-D sinc envelope. As shown in FIG. 6B, when this final result image is observed from 3-D view, it can be seen that the matched rotation angle is obtained when the maximum peak signal appears, that is, when the 2-D peak signal (i.e., 2-D sinc signal) is detected, and the result is in line with expectation.

In the third example, in the next step S140, similarly to that of the first example, in response to knowing two of three physical parameters used in the interferometric measurement including the refractive index of media, the wavelength of incident light, and the curvature radius of the surface to be measured of the optical device, the other one is calculated according to the matched order.

For example, after the matched order of the intensity distribution signals of the Newton's rings fringe pattern is determined, the curvature radius of the surface to be measured of the optical device can be obtained through equation (10) in case that the refractive index of media, the wavelength of incident light, and the matched rotation angle are known.

Further, unlike the first example, a coordinate set (i.e., 2-D coordinates) of the ring-center of the Newton's rings fringe pattern can be calculated directly from the coordinate set (i.e., 2-D coordinates) of position at which a maximum FRFT amplitude value under the matched rotation angle appears.

In this case, step S140 may include: determining a coordinate set of the maximum magnitude peak in a 2-D FRFT domain; and determining a coordinate set of a ring-center of the Newton's rings fringe pattern according to the matched order and the coordinate set, the coordinate set of the ring-center including a coordinate in the first direction and a coordinate in the second direction.

For example, under the matched rotation angle, the FRFT of each row/column is a peak signal, i.e., 1-D sine signal. For the Newton's rings fringe pattern, coordinates $(x_0, y_0)$ of the ring-center of the Newton's rings fringe pattern can be calculated according to equations (11) and (12) from the position $(u_{x0}, u_{y0})$ at which the magnitude peak appears, so as to achieve estimation of the coordinates of the ring-center of the Newton's rings fringe pattern.

Thus it can be seen that, in the third example of the first embodiment of the present disclosure, in order to improve estimation accuracy of the physical parameters, the matched order can be determined by performing the 2-D FRFT on the intensity distribution signals of the entire Newton's rings fringe pattern respectively under each FRFT order in the searching range of FRFT orders, and various physical parameters involved in the interferometric measurement can be estimated by using information such as the matched order and the position at which the magnitude peak thereof appears. Thus, by determining the matched order based on the entire Newton's rings fringe pattern, the procedure of the physical parameter estimation are not sensitive to local noise and obstacles in the Newton's rings fringe pattern, and relatively accurate physical parameters can be estimated effectively even when the fringe pattern is blocked somewhere or even when the ring-center of the Newton's rings is not on the fringe pattern.

It is found through experiments that when the Newton's rings fringe pattern is analyzed, the method in the third example has the following advantages:

1. When there is noise in the Newton's rings fringe pattern and the Signal-to-Noise Ratio (SNR)≥0dB, a relative error of the curvature radius estimated in the present disclosure is found to be approximately 0.22%, and the estimated position of a central pixel of the Newton's rings only has a deviation of only 2 pixels. When the SNR is lowers to −10dB, the relative error of the estimated curvature radius is 1.3%, and the deviation of the estimated position is the same.

2. When the Newton's rings fringe pattern is blocked by obstacles and the blocked area is at the center of the Newton's rings fringe pattern, the relative error of the curvature radius estimated in the present disclosure is 0.22%, and the estimated position of the central pixel of the Newton's rings has a deviation of only 2 pixels. When the blocked area is at other positions, the relative error of the estimated curvature radius is 0.41%, and the deviation of the estimated position is the same.

Therefore, it can be seen that in the third example, since the accuracy of algorithms adopted in steps S110 to S140 has a certain limitation per se, a very small amount of errors may still exist in the estimated physical parameters.

In order to address the above problem, in the fourth example, after step S140, the physical parameter estimating method may further include: performing an error correction on the estimated physical parameters.

Apparently, in different embodiments of the present disclosure, various kinds of error correction methods can be adopted to conduct some fine adjustment to the estimated physical parameters. In one example, the error correction can be performed by using a least square fitting method.

In this case, the step of error correction may include: correcting the estimated physical parameter using an intensity distribution model of the Newton's rings fringe pattern and pixel intensity values in the Newton's rings fringe pattern by taking the estimated physical parameter as an initial value for a least square fitting method.

The idea of correcting the physical parameters by using the least square fitting method is that: given a set of estimated physical parameters, intensity distribution of the fringe pattern can be calculated through mathematical expression form of the Newton's rings fringe pattern, a difference between the calculated intensity distribution and the intensity distribution of the Newton's rings fringe pattern to be analyzed is calculated, and the physical parameters corresponding to a minimum value of the squared difference will be the corrected physical parameters.

In one example, obtaining the minimum value of the squared difference can derive the corrected physical parameters by taking a derivative of the difference function with respect to the physical parameters and letting the derivative to be equal to zero.

For example, the intensity distribution of the Newton's rings fringe pattern as expressed in equation (2) can be further described by using the following mathematical function as expressed in equation (13):

$$\begin{aligned} f_N(x, y; A) &= f_N(x, y) \\ &= I_0 + I_1 \cos(\pi K r^2 + \pi) \\ &= I_0 + I_1 \cos[\pi K(x-x_0)^2 + \pi K(y-y_0)^2 + \pi] \\ &= a_1 + a_1 \cos[a_2(x-a_3)^2 + a_2(y-a_4)^2 + a_5] \end{aligned} \quad (13)$$

where in some cases, the background intensity $I_0$ and the fringe amplitude $I_1$ in the Newton's rings fringe pattern are assumed approximately the same and are constants respectively, $I_0$ and $I_1$ can be expressed collectively by $a_1$, that is, $(a_1, a_2, a_3, a_4, a_5)$ is a simplified symbol description of $(I_0$ and $I_1$, K, $x_0$, $y_0$, $\pi)$ respectively. It is to be appreciated that although $a_5$ is $\pi$ in the Newton's rings fringe pattern obtained when measuring the plano-convex lens, $a_5$ may not be $\pi$ but any other constants in other Newton's rings fringe pattern obtained when measuring other unit to be measured, and thus it may still need to be corrected. It can be seen from equation (13) that intensity distribution $f_N(x, y; A)$ at the each pixel position (x, y) can be derived once values of coefficients $(a_1, a_2, a_3, a_4, a_5)$ are known. In order to facilitate description, the coefficients $(a_1, a_2, a_3, a_4, a_5)$ are expressed collectively by an overall coefficient A in equation (13), and then $f_N(x, y)$ is expressed by $f_N(x, y; A)$. This expression can show a relationship between the intensity distribution $f_N(x, y)$ and the coefficient A more intuitively.

As mentioned above, the essence of the least square fitting method is to derive the coefficient A so as to minimize a square of a difference between a fringe distribution expressed by this coefficient and the actual fringe distribution, as expressed by equation (14):

$$\min_A \chi^2(A) = \min_A \|f_N(A, X) - Y\|_2^2 = \min_A \sum_i (f_N(A, X_i) - Y_i)^2 \quad (14)$$

where the coefficient A can be obtained by taking a derivative of the function $\chi^2(A) = \|f_N(A,X) - Y\|_2^2$ with respect to the coefficient A and letting the derivative to be zero.

However, since the expression of equation (13) is complex, in another example, $f_N(x, y; A)$ is first Taylor expanded, for example first-order Taylor expanded, at an initial value A0 (A0 represents the coefficients estimated by the FRFT in the step S110 to S140, i.e., five coefficients to be corrected. That is, like A, A0 includes five parameters). The form of the Taylor expansion is expressed in equation (15):

$$f_N(x, y; A) = f_N(x, y; A_0) + \frac{\partial f_N(x, y; A_0)}{\partial A} \cdot (A - A_0) \quad (15)$$
$$= f_N(x, y; A_0) + \frac{\partial f_N(x, y; A_0)}{\partial A} \cdot \varepsilon(A)$$

Then, a difference between $f_N(x, y; A)$ and the intensity distribution Y of the fringe pattern to be processed is calculated, and the square of the difference is obtained, as expressed in equation (16):

$$\chi^2(A) = \|f_N(x, y; A) - Y\|_2^2 \quad (16)$$
$$= \left\|f_N(x, y; A_0) + \frac{\partial f_N(x, y; A_0)}{\partial A} \cdot (A - A_0) - Y\right\|_2^2$$
$$= \left\|f_N(x, y; A_0) - Y + \frac{\partial f_N(x, y; A_0)}{\partial A} \cdot \varepsilon_A\right\|_2^2$$
$$= \left\|S_0 + \frac{\partial f_N(x, y; A_0)}{\partial A} \cdot \varepsilon_A\right\|_2^2$$

where $\varepsilon_A = A - A_0$, and the item $S_0 = f_N(x, y; A_0) - Y$ is a constant (this is because A0 is known, then $f_N(x, y; A_0)$ is known, and $$\frac{\partial f_N(x, y; A_0)}{\partial A}$$

is also a constant.

Next, it can be known from equation (16) that $\chi^2(A)$ is a function of $\varepsilon_A$. Thus, A minimum value of $\chi^2$ (A) can be derived simply by taking a derivative of the function $\chi^2$ (A) with respect to $\varepsilon_A$ (that is, considering the $\varepsilon_A$ as an unknown number) and letting the derivative to be 0 to derive $\varepsilon_A$. And since $\varepsilon_A = A - A_0$ and $A_0$ is known, the corrected coefficient A can be obtained.

Further, in the fourth example, the coefficient A obtained above can be re-used as a new initial value A0, and the above steps can be repeated to obtain a re-corrected coefficient A. And so forth, multiple corrections can be conducted iteratively until a difference between the newly obtained A and the previous A0 is less than or equal to a threshold.

In the fourth example, after the above error correction, when there is noise in the Newton's rings fringe pattern, the relative error of the curvature radius estimated by the present disclosure is further reduced as compared to the third example, and the deviation of the estimated pixel position of the center of the Newton's rings may be reduced to zero.

Thus it can be seen that, in the fourth example of the first embodiment of the present disclosure, on the basis of the first to the third examples, by utilizing the characteristic that the error correction method only depends on the initial value, correction may be performed by taking value of the estimation provided by the FRFT as an initial value, thereby improving the accuracy of the physical parameter estimation sufficiently. In particular, the pixel position of the ring-center of the Newton's rings is improved most. Moreover, a complex design of optical path is avoided in practical applications, and artificial errors are reduced.

In the first embodiment, the physical parameter estimating method according to the embodiments of the present disclosure is described by taking the Newton's rings fringe pattern as an example. However, the present disclosure is not limited thereto. For example, the physical parameter estimating method can also be applied to other interference fringe patterns having a quadratic phase, to estimate related physical parameters in the interferometric measurement based on the interference fringe patterns. Hereinafter, this is described in the second embodiment.

Figure 7:
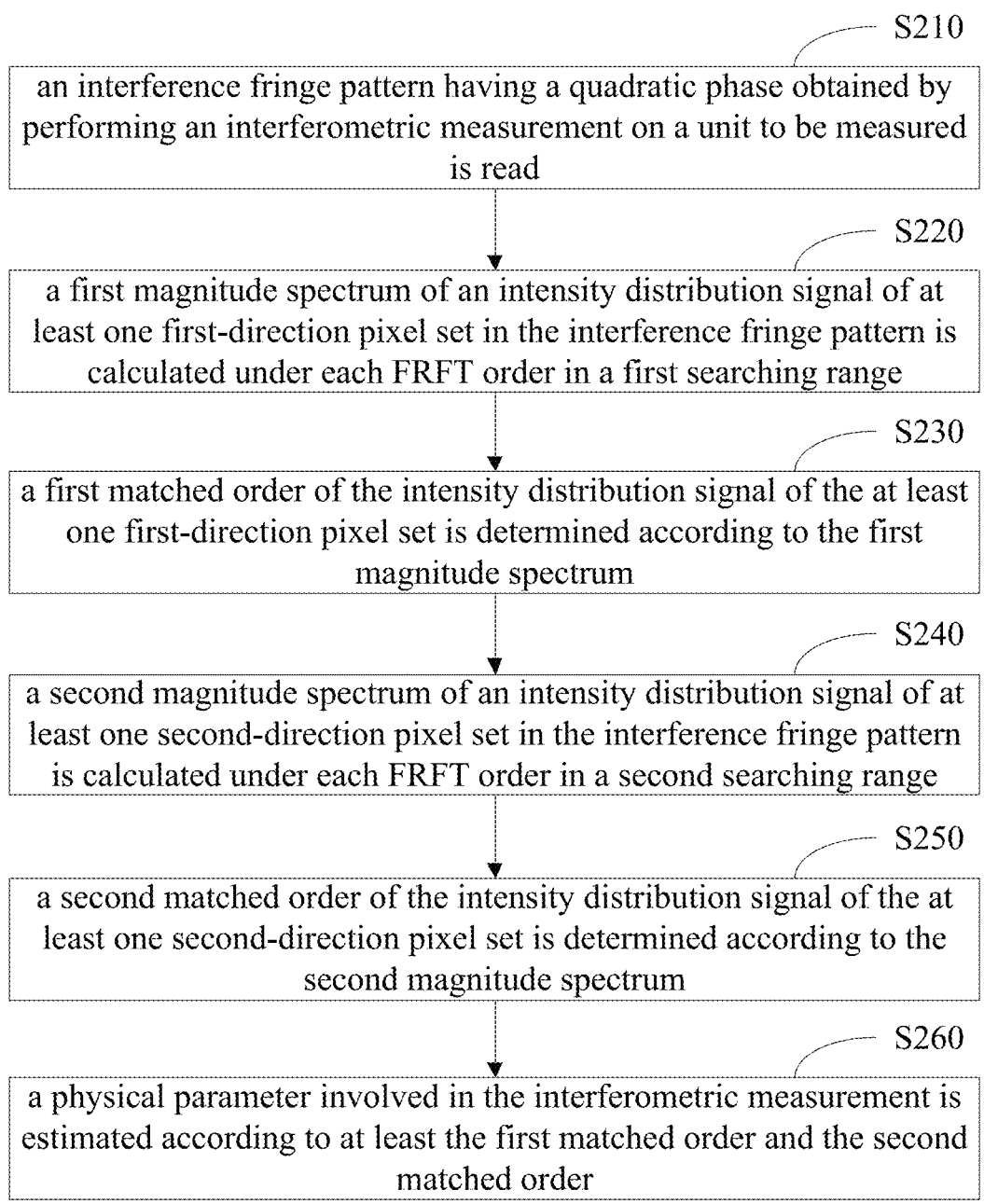
FIG. 7 illustrates a flow chart of a physical parameter estimating method according to a second embodiment of the present disclosure.

FIG. 7 illustrates a flow chart of a physical parameter estimating method according to a second embodiment of the present disclosure.

As shown in FIG. 7, a physical parameter estimating method according to the second embodiment of the present disclosure may include:

In step S210, an interference fringe pattern having a quadratic phase obtained by performing an interferometric measurement on a unit to be measured is read.

Figure 8A:
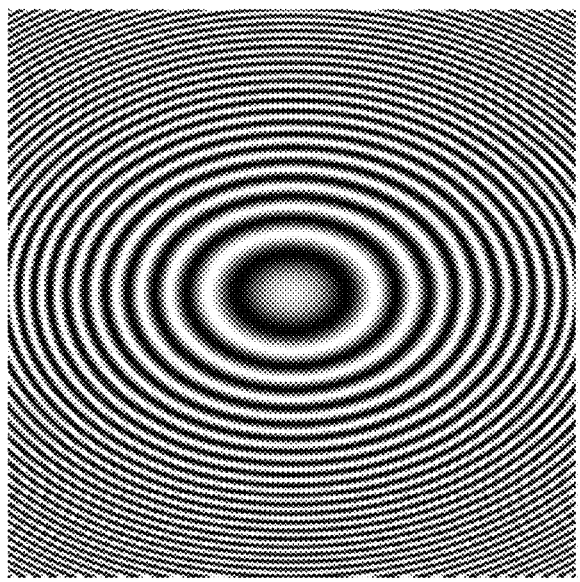
FIG. 8A and 8B illustrate schematic diagrams of two example interference fringe patterns each having a quadratic phase according to an embodiment of the present disclosure, respectively.
Figure 8B:
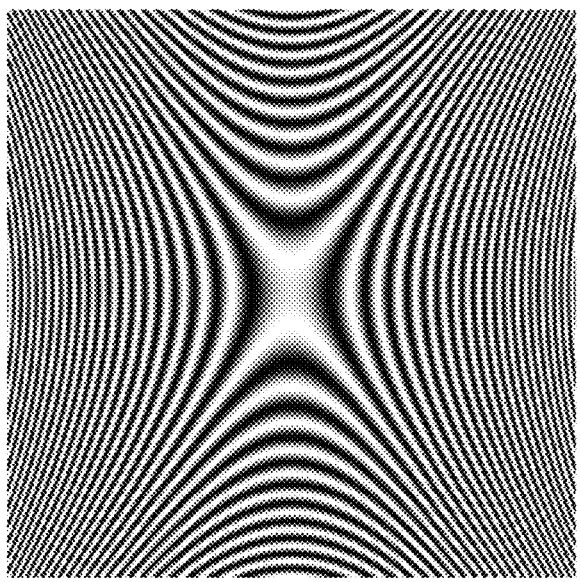

FIG. 8A and 8B illustrate schematic diagrams of two example interference fringe patterns each having a quadratic phase according to an embodiment of the present disclosure, respectively.

A closed electronic speckle interference (ESPI) fringe pattern is shown in FIG. 8A, and an unclosed ESPI fringe pattern is shown in FIG. 8B. The ESPI technique is to use a laser speckle pattern as an information carrier of field variation of an object to be measured, so as to detect a phase change of the speckle patterns of dual laser beams by using interference-speckle-field-related interference fringes generated by irradiating a laser light onto the object to be measured. For example, a laser beam is diffused by lens and projected onto a surface of the object to be measured, and a reflected light has interference with a reference light beam projected from a laser directly to a camera, so as to generate a speckle field and a series of speckle images at the irradiated surface. The ESPI nondestructive detecting technique can implement various kinds of measurements such as displacement, strain, surface defect, and crack.

Of course, the present disclosure is not limited thereto, but may also be applied to other interference fringe patterns having the quadratic phase, for example, the above-described Newton's rings fringe patterns, holographic interference fringe patterns, or the like.

Like the Newton's rings fringe pattern, it is proved that, after being simplified, a mathematical expression of an intensity distribution signal of respective pixels in other fringe patterns having a quadratic phase also has a form similar to the 2-D chirp signal. A mathematical expression $f_N(x, y)$ of an intensity distribution signal at a position of a pixel $(x, y)$ is shown in equation (17):

$$f_N(x, y) = I_0 + I_1 \cos(2\pi f_{cen1} x + \pi K_1 x^2 + \phi_1 + 2\pi f_{cen2} Y + \pi K_2 Y^2 + \phi_2) \quad (17)$$

where $I_0$ is a background intensity of the fringe pattern, $I_1$ is an amplitude of the fringe pattern, $f_{cen1}$ is a center frequency in x-direction in the fringe pattern, $K_1$ is a chirp rate in the x-direction, $\phi_1$ is a phase of the fringe pattern in the x-direction, $f_{cen2}$ is a center frequency in y-direction in the fringe pattern, $K_2$ is a chirp rate in the y-direction, and $\phi_2$ is a phase of the fringe pattern in the y-direction.

Thus, it can be seen that, unlike the Newton's rings fringe pattern, pixels in each row or each column of in a general interference fringe pattern having the quadratic phase have different distribution, that is, the chirp rate $K_1$ and phase $\phi_1$ of all rows are different from the chirp rate $K_2$ and phase $\phi_2$ of all columns. Thus, calculation needs to be conducted for rows and columns respectively.

In step S220, a first magnitude spectrum of an intensity distribution signal of at least one first-direction pixel set in the interference fringe pattern is calculated under each fractional Fourier transform (FRFT) order in a first searching range of FRFT orders. The first-direction pixel set includes a line of pixels in a first direction, and the first direction is one of a row direction and a column direction of the interference fringe pattern.

In step S230, a first matched order of the intensity distribution signal of the at least one first-direction pixel set is determined according to the first magnitude spectrum calculated under each FRFT order in the first searching range of FRFT orders.

For example, a 1-D FRFT is performed on an intensity distribution signal of one of rows of pixels and columns of pixels under each FRFT order in the searching range of FRFT orders, to obtain a 1-D magnitude spectrum of the intensity distribution signal of one of the rows of pixels and the columns of pixels under the FRFT order respectively. After obtaining all of the 1-D magnitude spectrums of the intensity distribution signal of one of the rows of pixels and the columns of pixels under each FRFT order respectively, it may be detected whether one of the rows of pixels and the columns of pixels reaches a peak of the 1-D magnitude spectrum after the FRFT. If the peak is reached, it means that the rotation angle is matched with the chirp rate K of the intensity distribution signal of one of the rows of pixels and the columns of pixels, thus the first matched order is obtained.

Since the steps S220 and S230 in the second embodiment are the same as the steps S120 and S130 in the first example and the second example of the first embodiment, the detailed description thereof is omitted here.

In step S240, a second magnitude spectrum of an intensity distribution signal of at least one second-direction pixel set in the interference fringe pattern is calculated under each FRFT order in a second searching range of FRFT orders. The second-direction pixel set includes a line of pixels in a second direction, and the second direction is perpendicular to the first direction.

In step S250, a second matched order of the intensity distribution signal of the at least one second-direction pixel set is determined according to the second magnitude spectrum calculated under each FRFT order in the second searching range of FRFT orders.

Similarly, for example, a 1-D FRFT is performed on an intensity distribution signal of the other of rows of pixels and columns of pixels under each FRFT order in the searching range of FRFT orders, to obtain a 1-D magnitude spectrum of the intensity distribution signal of the other of the rows of pixels and the columns of pixels under the FRFT order respectively. After obtaining all of the 1-D magnitude spectrums of the intensity distribution signal of the other of the rows of pixels and the columns of pixels under each FRFT order respectively, it may be detected whether the other of the rows of pixels and the columns of pixels reaches a peak of the 1-D magnitude spectrum after the FRFT. If the peak is reached, it means that the rotation angle is matched with the chirp rate K of the intensity distribution signal of the other of the rows of pixels and the columns of pixels, thus the second matched order is obtained.

Since the steps S240 and S250 in the second embodiment are the same as the steps S120 and S130 in the first example and the second example of the first embodiment, the detailed description thereof is omitted here.

In step S260, a physical parameter involved in the interferometric measurement is estimated according to at least the first matched order and the second matched order.

For example, the step S260 in the second embodiment is the same as the step S140 in the first embodiment, the detailed description thereof is omitted here. For example, after determining the matched orders of the intensity distribution signals of the rows of pixels and the columns of pixels, various physical parameters, such as deformation, displacement in x-direction and y-direction, of the unit to be measured can be obtained based on at least the matched order respectively.

Thus it can be seen that, by adopting the physical parameter estimating method according to the second embodiment of the present disclosure, the interference fringe pattern having the quadratic phase can be further processed on the basis of processing the Newton's rings fringe pattern, so that various physical parameters involved in the interferometric measurement can be estimated with high accuracy and simultaneously even in presence of noise and obstacles in the interference fringe pattern. And, the procedure of estimation is not influenced by the human factors so that artificial errors are reduced.

It is to be appreciated that, although the present disclosure is described by taking the interference fringe pattern having the quadratic phase as an example in the above two embodiments, the present disclosure is not limited thereto, and the present disclosure can also be applied to interference fringe patterns having other complex phase, as long as the interference fringe pattern can be piecewise-approximated as an interference fringe pattern having a quadratic phase.

Therefore, in one example of the embodiment, before the step S210, the physical parameter estimating method may also include: receiving an interference fringe pattern having a complex phase higher than the quadratic phase obtained by performing the interferometric measurement on the unit to be measured; and piecewise-approximating the interference fringe pattern having the complex phase into a plurality of interference fringe patterns having the quadratic phase.

Further, in a further example, after the step S260, the physical parameter estimating method may also include: synthesizing the physical parameters estimated with respect to each of the plurality of interference fringe patterns having the quadratic phase to generate a synthesized physical parameter.

For example, a surface shape of the unit to be measured can be obtained by synthesizing various physical parameters of the unit in the x-direction and y-direction.

It has been found through experiments that it takes a relatively long time to estimate a physical parameter using FRFT, especially for a larger-sized Newton's rings fringe pattern. Even after optimization of an implementation method, it still needs 500 seconds to analyze a 1920×1080 pixels of Newton's rings fringe pattern. A long time consumption is not conducive to the practical engineering application of the above method according to an embodiment of the present disclosure.

In order to reduce the time consumption for estimating the physical parameter using FRFT to analyze the Newton's rings fringe pattern, the embodiment of the present disclosure further provides a following third embodiment. In the third embodiment, the method for estimating a physical parameter obtains a smaller-sized Newton's rings fringe pattern by downsampling the Newton's rings fringe pattern before the step of FRFT analysis, and by performing a FRFT analysis on the smaller-sized Newton's rings fringe pattern to estimate a physical parameter involved in the interferometric measurement, thereby greatly reducing the time consumption and increasing the processing speed while retaining the advantages of higher precision and the like in the first embodiment.

Figure 9:
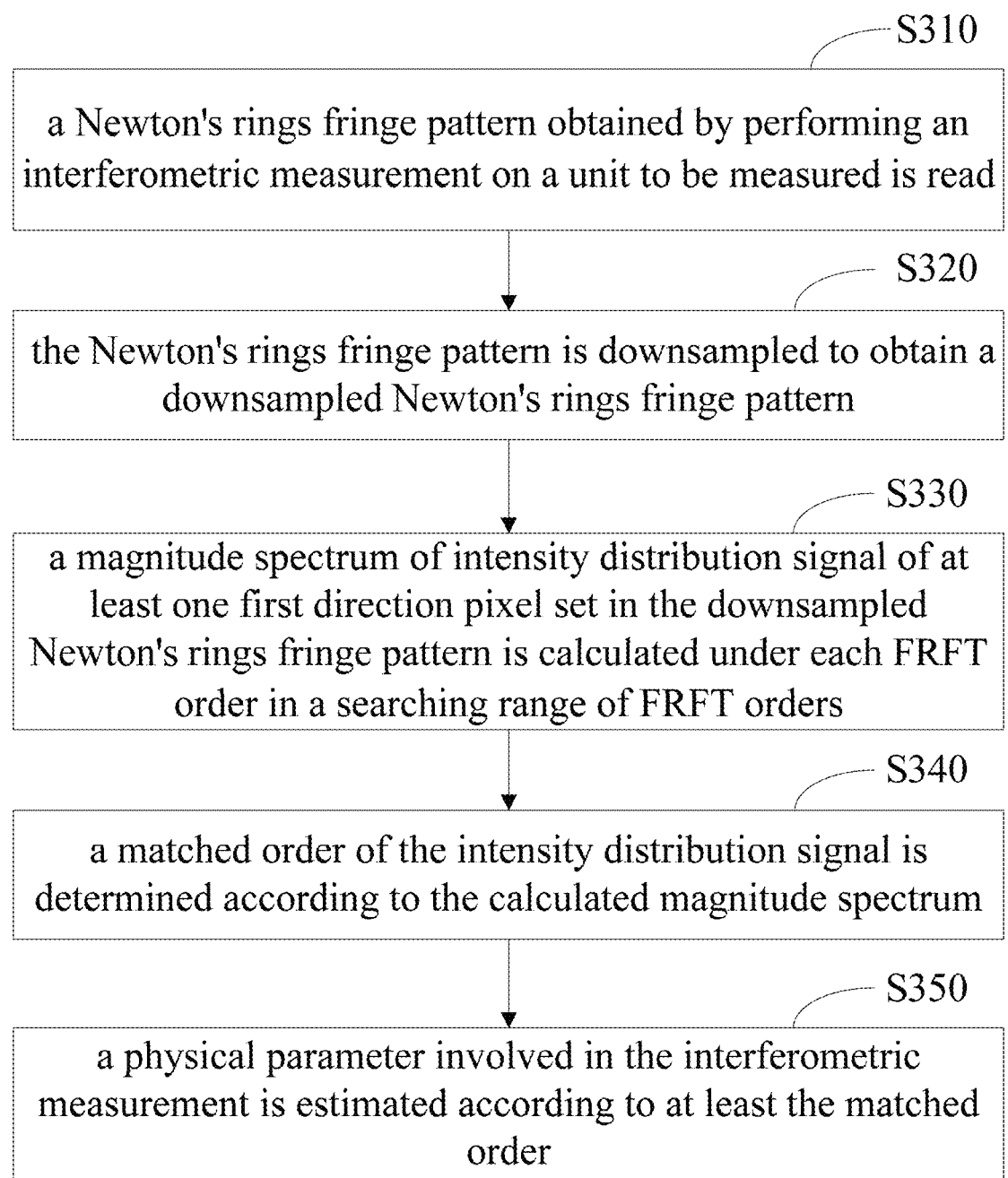
FIG. 9 illustrates a flow chart of a physical parameter estimating method according to a third embodiment of the present disclosure.

FIG. 9 illustrates a flow chart of a physical parameter estimating method according to a third embodiment of the present disclosure.

As shown in FIG. 9, the physical parameter estimating method according to the third embodiment of the present disclosure may comprise:

In step S310, a Newton's rings fringe pattern obtained by performing an interferometric measurement on a unit to be measured is read;

In step S320, the Newton's rings fringe pattern is downsampled to obtain a downsampled Newton's rings fringe pattern;

In step S330, a magnitude spectrum of an intensity distribution signal of at least one first direction pixel set in the downsampled Newton's rings fringe pattern under each FRFT order in a searching range of FRFT orders is calculated, the first direction pixel set including a row of pixels in a first direction, the first direction being one of a row direction and a column direction of the downsampled Newton's rings fringe pattern;

In step S340, a matched order of the intensity distribution signal is determined according to the calculated magnitude spectrum;

In step S350, a physical parameter involved in the interferometric measurement is estimated according to at least the matching order.

According to the physical parameter estimating method according to the third embodiment of the present disclosure, the image size is reduced by downsampling the Newton's rings fringe pattern, and the data participating in the calculation is reduced, thereby achieving the purpose of reducing the calculation amount and reducing the time consumption for analyzing the Newton's rings fringe pattern. Moreover, by using a narrow bandwidth of chirp signals in the FRFT domain, the Newton's rings fringe pattern can be analyzed at a lower sampling frequency. Through experimental verification, the introduction of downsampling effectively reduces the time consumption of physical parameter estimation, and can simultaneously estimate various physical parameters involved in interferometric measurement with high accuracy in the presence of noise and interference in the Newton's rings fringe pattern. And the estimation process is not affected by human factors, thereby reducing manual errors.

In this embodiment, step S310 is the same as step S110 in the first embodiment, and a detailed description thereof is omitted herein.

In order to avoid to affect the accuracy of the physical parameter estimation due to aliasing, it is necessary to determine an appropriate sampling frequency before step S320, that is, to determine an appropriate sampling factor.

It can be seen that each row of pixels or each column of pixels in the Newton's rings fringe pattern can be viewed as a finite-length one-dimensional chirp signal with the same chirp rate. Specifically, the complex mathematical expression of the intensity distribution signal for each row of pixels is shown in equation (18):

$$f_N(x) = \text{rect}(x/X_m) I_1 \exp[j\pi K x^2 + j2\pi f_{cen} x + j\phi_y] \quad (18)$$

And the mathematical expression of the intensity distribution signal for each column of pixels is shown in equation (19):

$$f_N(y) = \text{rect}(y/Y_m) I_1 \exp[j\pi K y^2 + j2\pi f_{cen} y + j\phi_x] \quad (19)$$

Where Xm represents an actual length of the Newton's rings fringe pattern (in meters) and Ym represents an actual width of the Newton's rings fringe pattern (in meters).

As can be seen from equations (6), (8), (18), and (19), the mathematical expression under the matched rotation angle $F_\alpha(u)$ is shown in equation (20):

$$F_\alpha(u) = I_1 B_\alpha X_m \exp(j\pi u^2 \cot \alpha + j\phi) \sin c[\phi(u \csc \alpha - f_{cen}) X_m] \quad (20)$$

Figure 10:
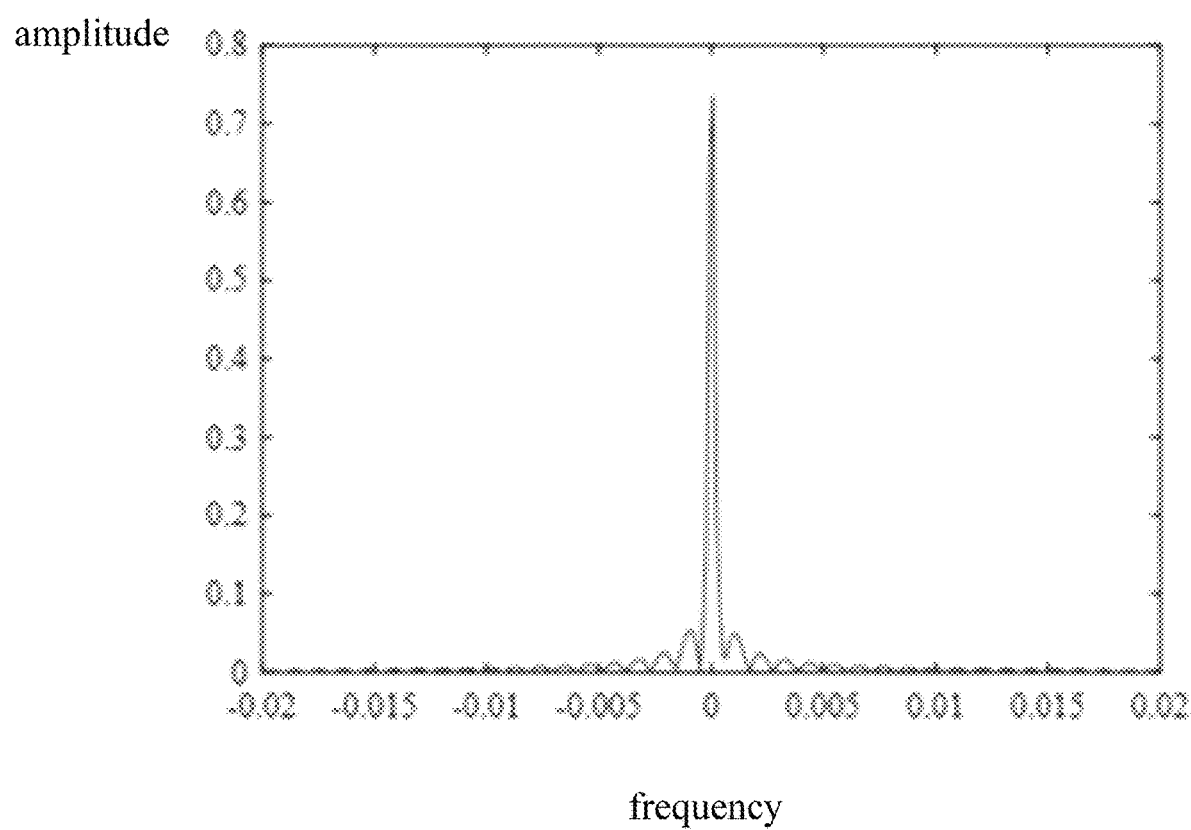
FIG. 10 illustrates a schematic diagram of magnitude spectrums of a finite-length one-dimensional (1-D) chirp signal according to an embodiment of the present disclosure.

It can be seen from equation (20) that the FRFT of the intensity distribution signal of each row of pixels or column of pixels in the Newton's rings fringe pattern is in the form of a sinc function under the matched rotation angle. FIG. 10 illustrates a magnitude spectrum of a finite-length chirp signal under the matched rotation angle according to an embodiment of the present disclosure. It can be seen from FIG. 10 and equation (20) that the intensity distribution signal of each row of pixels or column of pixels in the Newton's rings fringe pattern under the matched rotation angle has a very narrow bandwidth in the FRFT domain. It can be seen that the intensity distribution signal of each row of pixels or column of pixels in the Newton's rings fringe pattern can be sampled at a very low sampling frequency in the FRFT domain.

In order to avoid the aliasing of the intensity distribution signals of each row of pixels or column of pixels in the Newton's rings fringe pattern in the FRFT domain, it is necessary to satisfy the sampling theorem of the FRFT domain, that is, for a chirp signal, when the signal bandwidth is limited, the frequency $u_s$ of the signal in the FRFT domain should be larger than the bandwidth $u_B$ of the signal, as shown in the following equation (21):

$$u_s = f_s |\sin \alpha| \geq u_B \quad (21)$$

Where fs represents the sampling frequency for a downsampled signal, $u_B$ represents the bandwidth of the downsampled signal, and $u_s$ represents a frequency of the downsampled signal in the FRFT domain.

The sampling factor M for downsampling the Newton's rings fringe pattern can be defined by a following equation (22):

$$M = \frac{f_0}{f_s} \quad (22)$$

Where $f_0$ represents a sampling frequency of an intensity distribution signal of each row of pixels or column of pixels in an original Newton's rings fringe pattern, and $f_s$ is a sampling frequency of an intensity distribution signal of each row of pixels or column of pixels in the downsampled Newton's rings fringe pattern.

Where $f_0$ satisfies the following equation (23):

$$f_0 = \frac{1}{T} \quad (23)$$

Where T represents the physical size of a single pixel in the Newton's rings fringe pattern.

It can be seen from equations (21)~(23) that in order to avoid the aliasing of the intensity distribution signals of each row of pixels or column of pixels in the Newton's rings fringe pattern in the FRFT domain, the sampling factor M of the intensity distribution signal of each row of pixels or column of pixels in the Newton's rings fringe pattern in the FRFT domain needs to satisfy the following equation (24):

$$M = \frac{f_0}{f_s} \leq \frac{\frac{1}{T}}{\frac{u_B}{|\sin\alpha|}} = \frac{|\sin\alpha|}{u_B T} \quad (24)$$

It can be seen from equation (24) that if the FRFT order corresponding to the maximum sampling factor is determined, the corresponding rotation angle and bandwidth can be determined, thereby determining the maximum sampling factor of the downsampling in step S320.

Considering that the FRFT-based physical parameter estimation in the present embodiment estimates a physical parameter by searching for a matched FRFT order within a searching range of FRFT, that is, a matched rotation angle, and the intensity distribution signal of a row of pixels or a column of pixels in the Newton's rings interferogram under the matched rotation angle has the narrowest bandwidth in the FRFT domain. Therefore, in order to ensure that there is no aliasing in the intensity distribution signals of a row of pixels or a column of pixels in the Newton's rings interferogram within the searching range of FRFT, it is selected within the FRFT searching range to determine the maximum sampling factor required for downsampling in step S320.

Therefore, in order to predetermine a sampling factor suitable for downsampling the Newton's rings fringe pattern, in an example of the embodiment of the present disclosure, before step S320, the method may further comprise: determining the maximum sampling factor for downsampling in the searching range of FRFT orders. In this example, by finding the maximum sampling factor suitable for the searching range of FRFT orders, it is ensured that highly accurate physical parameters can be estimated in a FRFT analysis on the downsampled Newton's rings fringe pattern in the searching range of FRFT orders.

In the above example, the searching range of FRFT orders may be determined before step S320. In this embodiment, various means can also be used to determine the searching range of FRFT orders in advance. Specifically, the physical parameter estimating method of the present embodiment, before step S320, may further comprise: determining a range of at least some of the physical parameters involved in the interferometric measurement according to environment and requirement of the interferometric measurement; determining a value range of FRFT order according to the ranges of the at least some parameters; and determining each FRFT order in the searching range of FRFT orders by dividing the value range by an appropriate step size. The specific implementation process of determining the searching range of FRFT orders in this embodiment is the same as that of the first embodiment, and a detailed description thereof is omitted herein.

In the embodiment of the present disclosure, the maximum sampling factor can be determined in the searching range of FRFT orders by various means. In some examples, the step of determining the maximum sampling factor of the downsampling in the searching range of FRFT orders may include: step a1, searching for a first FRFT order in the searching range of FRFT orders, the first FRFT order corresponding to the maximum sampling factor; step a2, calculating a magnitude spectrum of an intensity distribution signal of a selected row of pixels or a selected column of pixels in the Newton's rings fringe pattern under the first FRFT order; and step a3, calculating the maximum sampling factor according to a rotation angle corresponding to the first FRFT order and a bandwidth determined on the basis of a maximum magnitude peak in the magnitude spectrum.

Figure 11:
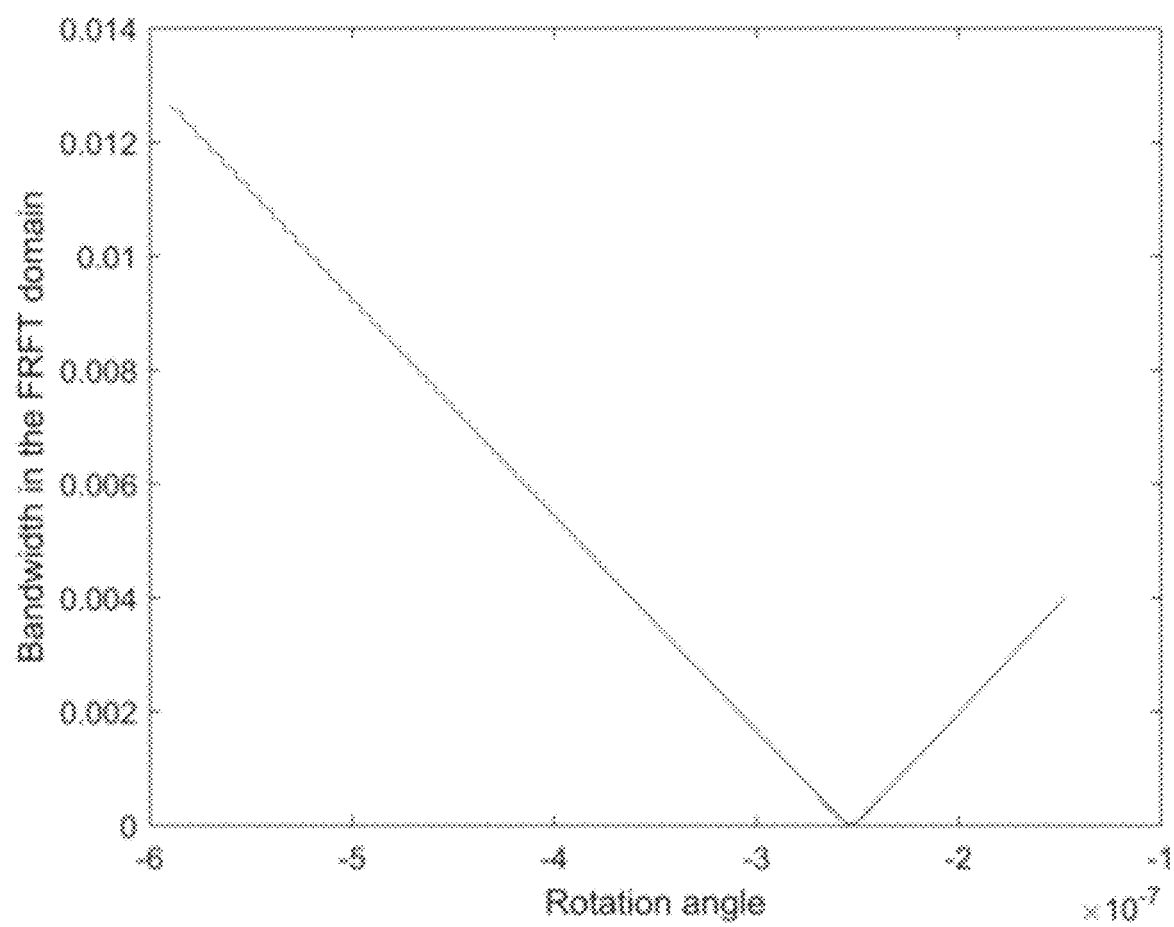
FIG. 11 illustrates a schematic diagram of relationship between a bandwidth in a FRFT domain and the rotational angel in a searching range of FRFT orders of an intensity distribution signal for a pixel row or a pixel column in the Newton's rings fringe pattern according to an embodiment of the present disclosure.

It has been found experimentally that the maximum sampling factor can be determined with a high probability under an edge order of the FRFT searching range (i.e. under the maximum FRFT order or the minimum FRFT order within the searching range of FRFT). For example, in the scenario shown in FIG. 2A, a transform order p is roughly estimated to be $-4e^{-7}$ to $-1e^{-7}$, and a value range of the rotation angle in the searching range of FRFT roughly estimated by equation (7) is $-5.90 \times 10^{-7}$ to $-1.47 \times 10^{-7}$. FIG. 11 illustrates the relationship, in this scenario, between rotation angles in the searching range of FRFT and bandwidths of the intensity distribution signal of a row of pixels and/or a column of pixels in the Newton's rings fringe pattern in the FRFT domain. It can be seen from FIG. 11 that in the searching range of FRFT, the intensity distribution signal of a row of pixels and/or a column of pixels in the Newton's rings fringe pattern under the matched rotation angle has the smallest bandwidth in the FRFT domain, and the intensity distribution signal of a row of pixels and/or a column of pixels in the Newton's rings fringe pattern has a bandwidth in the FRFT domain increasing with the rotation angle away from the matched rotation angel, and the maximum bandwidth, in the FRFT domain, of the intensity distribution signal of a row of pixels and a column of pixels in the Newton's rings fringe pattern in the searching range of FRFT can be obtained when the rotation angle takes a minimum value of $-5.90 \times 10^{-7}$ (i.e. under the minimum FRFT order). It can be seen that the maximum FRFT order or the minimum FRFT order may correspond to the maximum sampling factor with a larger probability.

Based on the above analysis, in order to reduce the amount of calculation, the first FRFT order described above can be found in the minimum FRFT order and the maximum FRFT order in the searching range of FRFT. Specifically, in an example of the embodiment of the present disclosure, step a1 may include: selecting one of the minimum FRFT order and the maximum FRFT order within the searching range of FRFT orders as the first FRFT order.

In some examples, the sampling factor corresponding to the minimum FRFT order and the sampling factor corresponding to the maximum FRFT order in some Newton's rings fringe patterns may be a little difference (for example, it does not exceed a predetermined threshold which may be preset or an empirical value. If the processing precision is higher, the threshold may be a value less than or equal to 1), one of the minimum FRFT order and the maximum FRFT order within the searching range of FRFT orders may be randomly selected as the first FRFT order. Of course, if the sampling factors corresponding to the respective FRFT orders in the Newton's rings fringe pattern may be a little difference between each other, at this time, one FRFT order may be randomly selected within the searching range of FRFT orders as the first FRFT order described above.

In an embodiment of the present disclosure, a first value corresponding to the first FRFT order may be larger than or equal to a first value corresponding to any other FRFT order in the searching range of FRFT orders, where the first value is equal to a quotient obtained by dividing the absolute value of sine of rotation angle by the bandwidth determined on the basis of the maximum magnitude peak in the magnitude spectrum. That is, the first value is equal to $$\frac{|\sin \alpha|}{u_B}.$$

In some examples, step a1 may include: calculating a first value corresponding to the maximum FRFT order and a first value corresponding to the minimum FRFT order, and selecting one of the minimum FRFT order and the maximum FRFT order which one corresponds to the larger first value as the first FRFT order described above.

In some examples, step a1 may include: calculating a first value corresponding to each FRFT order or a plurality of selected FRFT orders in the searching range of FRFT orders, and selecting a FRFT order with the greatest first value as the first FRFT order described above. In an example, the selected plurality of FRFT orders may be the maximum FRFT order and the minimum FRFT order described above. In an example, the selected plurality of FRFT orders may include a plurality of FRFT orders having a step size between adjacent FRFT orders larger than or equal to a predetermined threshold of step size. The threshold of step size may be an empirical value or may be set in advance. For example, the threshold of step size may take a multiple of an appropriate step size in the searching range of FRFT orders described above.

In an embodiment of the present disclosure, the bandwidth for calculating the maximum sampling factor may be determined by various means based on the maximum magnitude peak in the magnitude spectrum. For example, it can take a three-decibel bandwidth (3 dB bandwidth) corresponding to the maximum magnitude peak in the magnitude spectrum (that is, the bandwidth corresponding to a magnitude in the magnitude spectrum equal to half of the root of twice the maximum magnitude peak) as the bandwidth for calculating the maximum sampling factor, that is to say, the bandwidth determined on the basis of the maximum magnitude peak in the magnitude spectrum may be the three-decibel bandwidth of the maximum magnitude peak in the magnitude spectrum.

As described above, since rows and columns in the Newton's rings fringe pattern are all changed in the same manner, in other words, the maximum bandwidth corresponding to all the rows and the maximum bandwidth corresponding to all the columns are also the same, therefore, in an example of the embodiment of the present disclosure, the magnitude spectrum of any row of pixels or any column of pixels in the original Newton's rings fringe pattern can be directly calculated in step a2, in order to reduce the amount of calculation, increase the processing speed, and reduce the time consumption. In summary, the selected row of pixels in step a2 may be any one or more rows of pixels in the original Newton's rings fringe pattern; and/or the selected column of pixels in step a2 may be any one or more columns of pixels in the original Newton's rings fringe pattern.

In an example of the embodiment of the present disclosure, step a3 may include: calculating the maximum sampling factor from a rotation angle corresponding to the first FRFT order, a physical size of a single pixel in the Newton's rings fringe pattern, and a three-decibel bandwidth corresponding to the maximum magnitude peak in the corresponding magnitude spectrum. Specifically, the rotation angle corresponding to the first FRFT order may be calculated by equation (7), and a FRFT may be performed on any row of pixels or any column of pixels in the Newton's rings fringe pattern under the first FRFT order to obtain a corresponding magnitude spectrum, then the three-decibel bandwidth corresponding to the maximum magnitude peak in the magnitude spectrum under the first FRFT order is determined, and finally the maximum sampling factor required for downsampling in step S320 can be calculated by equation (24). In a specific application, if the maximum sampling factor is calculated by the three-decibel bandwidth corresponding to the maximum magnitude peak in the magnitude spectrum of a row of pixels, T in equation (24) can take the size of the single pixel of the Newton's rings fringe pattern in the row direction. If the maximum sampling factor is calculated by the three-decibel bandwidth corresponding to the maximum magnitude peak in the magnitude spectrum of a column of pixels, T in equation (24) can take the size of a single pixel of the Newton's rings fringe pattern in the column direction.

In step 320, the original Newton's rings fringe pattern may be downsampled in any one of a row direction and a column direction. In other words, in an example of the present embodiment, step S320 may include: performing a downsampling on the Newton's rings fringe pattern at least in the first direction by a decimation factor M, where M is any one of integers being larger than 1 and less than the maximum sampling factor, the first direction being one of a row direction and a column direction of the original Newton's rings fringe pattern.

In order to achieve higher processing speed, the Newton's rings fringe pattern can also be downsampled on both rows and columns. In other words, in an example of the present embodiment, step S320 may include: performing a downsampling on the Newton's rings fringe pattern in the first direction and the second direction at the same time by a decimation factor M, where M is any one of integers being larger than 1 and less than the maximum sampling factor, and the second direction being perpendicular to the first direction.

For example, for a Newton's rings fringe pattern with a size of 1920×1920, assuming that the maximum sampling factor is 16 and M is also taken as 16, the Newton's rings fringe pattern can be downsampled in the row direction, then the size of the downsampled Newton's rings fringe pattern is 120×1920, and the Newton's rings fringe pattern can be downsampled in both the row direction and the column direction, and the size of the downsampled Newton's rings fringe pattern is 120×120. It can be seen that the size of the Newton's ring fringe after downsampling will be reduced to one 256th of the original image, and the corresponding data for FRFT analysis will be reduced to one 256th of the original data, which will inevitably greatly reduce the time consumption.

In this embodiment, the downsampling can be implemented by various algorithms in step S320. Since rows and columns in the Newton's rings fringe pattern are all changed in the same manner, in an example, the Newton's ring fringe pattern is possible to be downsampled in a manner of M-sampled by extracting in the light of a decimation factor M (that is, one pixel can be extracted every M-1 pixels). Specifically, one pixel may be taken every M-1 pixels in the pixel sequence of the original Newton's rings fringe pattern, and the obtained pixels are combined into a new sequence, thereby obtaining a downsampled Newton's rings fringe pattern. In addition to this, other algorithms may be adopted to implement the downsampling in step S320.

In some examples, before step S320, the method may further comprise: removing a background intensity from an original Newton's rings fringe pattern. The specific implementation of removing the background intensity in these examples is the same as that in the first embodiment, and a detailed description thereof is also omitted herein.

In the present embodiment, steps S330 to S340 are the same as steps S120 to S130 of the respective examples in the first embodiment, and the only one difference is that steps S120 to S130 in the first embodiment directly employ the original Newton's rings fringe pattern to determine the matched order, while steps S330 to S340 employ the downsampled Newton's rings fringe pattern to determine the matched order. The implementation of steps S120 to S130 in the first example, the second example, and the third example of the first embodiment are all applicable to steps S330 to S340 in the third embodiment.

In one example, the at least one first direction pixel set includes only one first direction pixel set. Step S330 may include: performing a 1-DFRFT on an intensity distribution signal of the first direction pixel set in the downsampled Newton's rings fringe pattern under each FRFT order, to obtain a one-dimensional magnitude spectrum of the first direction pixel set under the FRFT order. Steps S330 to S340 of this example are the same as steps S120 to S130 of the first example in the first embodiment, and a detailed description thereof is omitted herein.

In an example, step S330 may include: for each of any of the plurality of first direction pixel sets, performing a 1-D FRFT on an intensity signal of the first direction pixel set under each FRFT order within the searching range of FRFT order, respectively, to obtain a one-dimensional magnitude spectrum of the intensity distribution signal of the first direction pixel set in the 1-D domain under each FRFT order. Steps S330 to S340 in this example are the same as steps S120 to S130 of the second example in the first embodiment, and a detailed description thereof is omitted herein.

In one example, step S330 may include: performing a two-dimensional (2-D) FRFT on the downsampled Newton's rings fringe pattern under each FRFT order, to obtain a two-dimensional magnitude spectrum of the downsampled Newton's rings fringe pattern under each FRFT order (i.e. the two-dimensional magnitude spectrum of the intensity distribution signal of all pixel sets in the downsampled Newton's rings fringe pattern under the FRFT order). Specifically, performing a 2-D FRFT on the downsampled Newton's rings fringe pattern actually is firstly, performing a 1-D FRFT on all rows of pixels (also called row vectors) in the downsampled Newton's rings fringe pattern, then performing the FRFT on the all column vectors of the intermediate result graph generated by the transform, or conversely, firstly perform a 1-D FRFT on all columns of pixels (also referred to as column vectors) in the downsampled Newton's rings fringe pattern, then performing the FRFT on all row vectors of the intermediate result graph generated by the transform. Steps S330 to S340 in this example are the same as steps S120 to S130 of the third example in the first embodiment, and a detailed description thereof is omitted herein.

In the third embodiment, step S350 is substantially the same as step S140 in the first embodiment, and the only one difference is that step S140 in the first embodiment uses the result of steps S120 to S130, that is, using the magnitude spectrum of the intensity signal of a row of pixels and/or a column of pixels in a pre-downsampling Newton's rings fringe pattern in the FRFT domain under the matched order to estimate a physical parameter involved in the interferometric measurement, while Step S350 may use the result of Steps S330-S340, i.e. using the magnitude spectrum of an intensity distribution signal of a row of pixels and/or a column of pixels in the downsampled Newton's rings fringe pattern under the matched order to estimate a physical parameter involved in the interferometric measurement, may also use the magnitude spectrum of the intensity distribution signal of a row of pixels and/or a column of pixels in the pre-downsampling Newton's rings fringe pattern (i.e. the original Newton's rings fringe pattern) under the matched order to estimate a physical parameter involved in the interferometric measurement.

In some examples, the unit to be measured is an optical device having a surface to be measured, and step S350 may include: calculating one of three physical parameters used in the interferometric measurement according to the matched order in response to knowing the other two physical parameters, the three physical parameters including a refractive index of media, a wavelength of incident light, and a curvature radius of the surface to be measured. In this example of the present embodiment, the specific method for calculating the radius of curvature, the wavelength of the incident light, and the refractive index of the medium is the same as that of the first embodiment described above, and a detailed description thereof is omitted herein.

In one example, for example, in a case where the ring-center is located at a central position of the Newton's rings fringe pattern, step S350 may include: determining a first coordinate, in the 1-D FRFT domain, of a maximum magnitude peak in the one-dimensional magnitude spectrum having the greatest magnitude peak; and determining a first direction coordinate of a ring-center position of the Newton's rings fringe pattern according to the matched order and the first coordinate, the first direction coordinate being a coordinate in the first direction. In this example, since the first coordinate of the magnitude peak in the one-dimensional magnitude spectrum of the intensity distribution signal of a certain row of pixels or a certain column of pixels in the downsampled Newton's rings fringe pattern in the 1-D FRFT domain under the matched order has been found in step S340, the first direction coordinate (for example, the x-axis coordinate) of the ring-center of the Newton's rings fringe pattern can be obtained according to equation (11), and then the first direction coordinate (e.g. x-axis coordinate) of a vertex position of the surface to be measured in a projection surface can be obtained according to the first direction coordinate of the ring-center.

Similarly, in order to obtain a complete ring-center of the Newton's rings fringe pattern, step S350 may further include: performing a 1-D FRFT on an intensity distribution signal of a second-direction pixel set in the downsampled Newton's rings fringe pattern under the matched order, to obtain a one-dimensional magnitude spectrum for the second-direction pixel set, the second-direction pixel set comprising a row of pixels in the second direction, the second direction being perpendicular to the first direction; determining a second coordinate of a magnitude peak in a 1-D magnitude spectrum of the second-direction pixel set in the 1-D FRFT domain; and determining a second-direction coordinate of the ring-center of the Newton's rings fringe pattern according to the matched order and the second coordinate, the second-direction coordinate is a coordinate in the second direction. Similarly, as in step S140 in the first embodiment, a one-dimensional magnitude spectrum of an intensity distribution signal $f_N(y)$ of the h-th column of pixel under the matched order can be directly calculated, in which the maximum magnitude and its second coordinate is searched for. And a second-direction coordinate (e.g. an y-axis coordinate) of the ring-center of the Newton's rings fringe pattern can be obtained according to the second coordinate and equation (12), then a second-direction coordinate (e.g. an y-axis coordinate) of the vertex position of the surface to be measured in a projecting surface can be obtained according to the second-direction coordinate of the ring-center.

In one example, step S350 may include: determining a coordinate set of a maximum magnitude peak in the 2-D magnitude spectrum having the maximum magnitude peak in step S330 in the 2-D FRFT domain; and determining a coordinate set of the ring-center of the Newton's rings fringe pattern according to the matched order and the coordinate set, the coordinate set of the ring-center including a coordinate in the first direction and a coordinate in the second direction. The specific implementation of this example is the same as step S140 of the third example in the first example, and a detailed description thereof is omitted herein.

It has been found through experiments that for the case where the ring-center is not located at the center of the Newton's rings interferogram, after the Newton's rings interferogram is downsampled, the calculation time is reduced and the curvature radius error is almost the same as that when the downsampling is not performed. However, the estimated position of the ring-center of the Newton's rings fringe pattern is larger, and the result is not accurate. In order to solve this problem, in some examples, the ring-center position of the Newton's rings fringe pattern may be estimated by performing the FRFT on the original Newton's rings interferogram under the matched order in step S350. With this example method, the ring-center position of the Newton's rings fringe pattern can be accurately obtained, although the time consumption will slightly increase (for example, by about 1 second), but the overall time consumption is still greatly reduced relative to the case without downsampling.

In one example, for example, if the ring-center is not located at the center position of the Newton's rings interferogram or the ring-center is located at the center position of the Newton's rings interferogram, step S350 may include: performing 1-D FRFT on an intensity distribution signal of a first-direction pixel set in a pre-downsampling Newton's rings fringe pattern (for example, the original Newton's rings fringe pattern or a grayscale image of the original Newton's rings fringe pattern) under the matched order, to obtain a one-dimensional magnitude spectrum for the first-direction pixel set under the matched order; determining a first coordinate of a maximum magnitude peak in the one-dimensional magnitude spectrum in the 1-D FRFT domain; and determining a first-direction coordinate of a ring-center position of the Newton's rings fringe pattern according to the matched order and the first coordinate, the first direction coordinate being a coordinate in the first direction.

Similarly, in order to obtain the complete ring-center of the Newton's rings fringe pattern, in this example, step S350 may further include: performing 1-D FRFT on an intensity distribution signal of a second-direction pixel set in a pre-downsampling Newton's rings fringe pattern (e.g. the original Newton's rings fringe pattern or a grayscale image of the original Newton's rings fringe pattern) under the matched order, to obtain a one-dimensional magnitude spectrum for the second-direction pixel set, the second-direction pixel set including a row of pixels in a second direction, the second direction being perpendicular to the first direction; determining a second coordinate, in the 1-D FRFT domain, of a magnitude peak in the one-dimensional magnitude spectrum for the second-direction pixel set; and a second direction coordinate of the ring-center of the Newton's rings fringe pattern according to the matched order and the second coordinate, the second direction coordinate being a coordinate in the second direction.

In one example, step S350 may include: performing a 2-D FRFT on a pre-downsampling Newton's rings fringe pattern (e.g. the original Newton's rings fringe pattern or a grayscale image in the original Newton's rings fringe pattern) under the matched order, to obtain a two-dimensional magnitude spectrum of the pre-downsampling Newton's rings fringe pattern under the matched order; determining a coordinate set of a maximum magnitude peak in the two-dimensional magnitude spectrum in the 2-D FRFT domain; and determining a coordinate set of the ring-center of the Newton's rings fringe pattern according to the matched order and the coordinate set, the coordinate set of the ring-center of the Newton's rings fringe pattern including a coordinate in the first direction and a coordinate in the second direction.

Similarly, various error correction means can be used in the third embodiment to fine tune the estimated physical parameters. In one example, the least square fitting method can be used for error correction.

In one example, the step of error correction in the third embodiment may include: taking the estimated physical parameter as an initial value of a least square fitting method, using an intensity distribution model of the pre-downsampling Newton's rings fringe pattern (e.g. the original Newton's rings fringe pattern) and a pixel intensity value in the pre-downsampling Newton's rings fringe pattern to correct the physical parameter. In this example, the pre-downsampling Newton's rings fringe pattern is used for error correction, which can improve the accuracy of the estimated physical parameter and fully improve the accuracy of physical parameter estimation.

The step of the error correction in the third embodiment is the same as the specific implementation of the error correction in the first embodiment, and a detailed description thereof is omitted herein.

It has been experimentally found that the method of the third embodiment has the following advantages when estimating a physical parameter by analyzing the Newton's rings fringe pattern:

1. The Newton's rings fringe pattern is downsampled according to the sampling theorem of the FRFT domain, and the FRFT transform is used to analyze the downsampled Newton's rings fringe pattern to estimate the physical parameters, and the time consumption is greatly reduced. Taking a Newton's rings fringe pattern of 1920×1080 as an example, in the hardware environment of FIGS. 2A-2B, the time consumption can be reduced to 1.3 seconds by introducing downsampling. This has high practical value in interferometric applications for some specific occasions.

2. For the Newton's rings fringe pattern contaminated by noise and the Newton's rings fringe pattern blocked or occluded partially, the physical parameters can still be estimated with high precision.

3. Because the Newton's rings fringe pattern is used as the chirp signal and is in sinc function form in the FRFT domain, it uses the characteristics of energy aggregation and narrow bandwidth to downsample the Newton's rings fringe pattern with a small sampling rate and analyze the downsampled Newton's rings fringe pattern, the Newton's rings fringe pattern does not alias in the FRFT domain, and can be analyzed by FRFT after downsampling to estimate a physical parameter, thus the following advantages are still retained, for example, the physical parameter estimating method for the Newton's rings fringe in the FRFT domain is simple operationally, and is of strong anti-interference and high precision etc.

In the above various embodiments of the present disclosure, in addition to the form defined by equation (6), the FRFT may be a discrete fractional Fourier transformation (DFRFT), which may also be defined as the following equation (25):

$$Y\alpha(m) = \Sigma_{n=-N}^{N} K_\alpha(m, n) * y(n) \quad (25)$$

Where $K_\alpha(m, n)$ represents a kernel function of DFRFT, $n = -N, -N+1, \ldots, N$, $m = -M, -M+1, \ldots, M$, N represents the number of samples on a certain row of pixels of the Newton's rings fringe pattern, and M represents the number of samples on the frequency u in the FRFT domain.

Where $y(n)$ and $Y_\alpha(m)$ are defined by the following equations (26) and (27):

$$y(n) = f(n\Delta x) \quad (26)$$

$$Y_\alpha(m) = F_\alpha(m\Delta u) \quad (27)$$

Where $f(n\Delta x)$ represents the intensity distribution signal of a row of pixels of the Newton's rings fringe pattern, and $\alpha$ is the rotation angle in the time-frequency plane.

Where $K_\alpha(m, n)$ can be defined by the following equation (28):

$$K_\alpha(m, n) = \sqrt{\frac{1 - j\cot\alpha}{2\pi}} \Delta x e^{\frac{j}{2}\cot\alpha m^2 \Delta u^2} e^{-j\csc\alpha nm\Delta u \Delta x} e^{\frac{j}{2}\cot\alpha n^2 \Delta x^2} \quad (28)$$

Where $\Delta x$ represents the sampling interval on a row of pixels of the Newton's rings fringe pattern, and $\Delta u$ represents the sampling interval on the frequency u in the FRFT domain.

Exemplary Application Scenario

The physical parameter estimating method according to various embodiments of the present disclosure can be applied in various kinds of scenarios. For example, it can be applied in teaching experiments or engineering measurements to estimate physical parameters of various kinds of units to be measured. Still further, in the latter scenario, it can be further evaluated whether the unit to be measured conforms to its standard requirement based on the estimated physical parameters.

Therefore, in the present disclosure, for example, after the step S150 of the first embodiment, or after the step S260 of the second embodiment, or after the step S350 of the third embodiment, the physical parameter estimating method may also include: comparing the estimated physical parameter with a reference physical parameter to determine a difference therebetween; deciding whether the difference is larger than or equal to a predetermined threshold; and determining that the unit to be measured does not conform to a specification for the unit in response to the difference being larger than or equal to the predetermined threshold; otherwise, determining that the unit to be measured conforms to the specification for the unit.

Hereinafter, an application scenario of the present disclosure is described by taking detection of an end surface of an optical fiber connector as an example.

The optical fiber connector is an important component to interface two optical fibers together. In the field of communication, in order to ensure signal transmission quality, the newly polished connector end faces has to be detected. The detection and control are mainly directed to key geometric parameters, such as curvature radius of the end surface, apex-offset of the end surface, inclination angle of the end surface, undercut of fiber, and roughness of the end surface of the optical fiber connector. In engineering practice, there is a standard on whether the end surface of the optical fiber connector produced is qualified. If various physical parameters of the end surface are in a range specified in the standard, the optical fiber connector is regarded as qualified. The physical parameter estimating method according to the embodiments of the present disclosure can be used to estimate the curvature radius and the apex-offset of the end surface of the optical fiber connector, so as to decide whether the grinded end surface of the optical fiber connector is appropriate for being shipped and brought into use.

Figure 12:
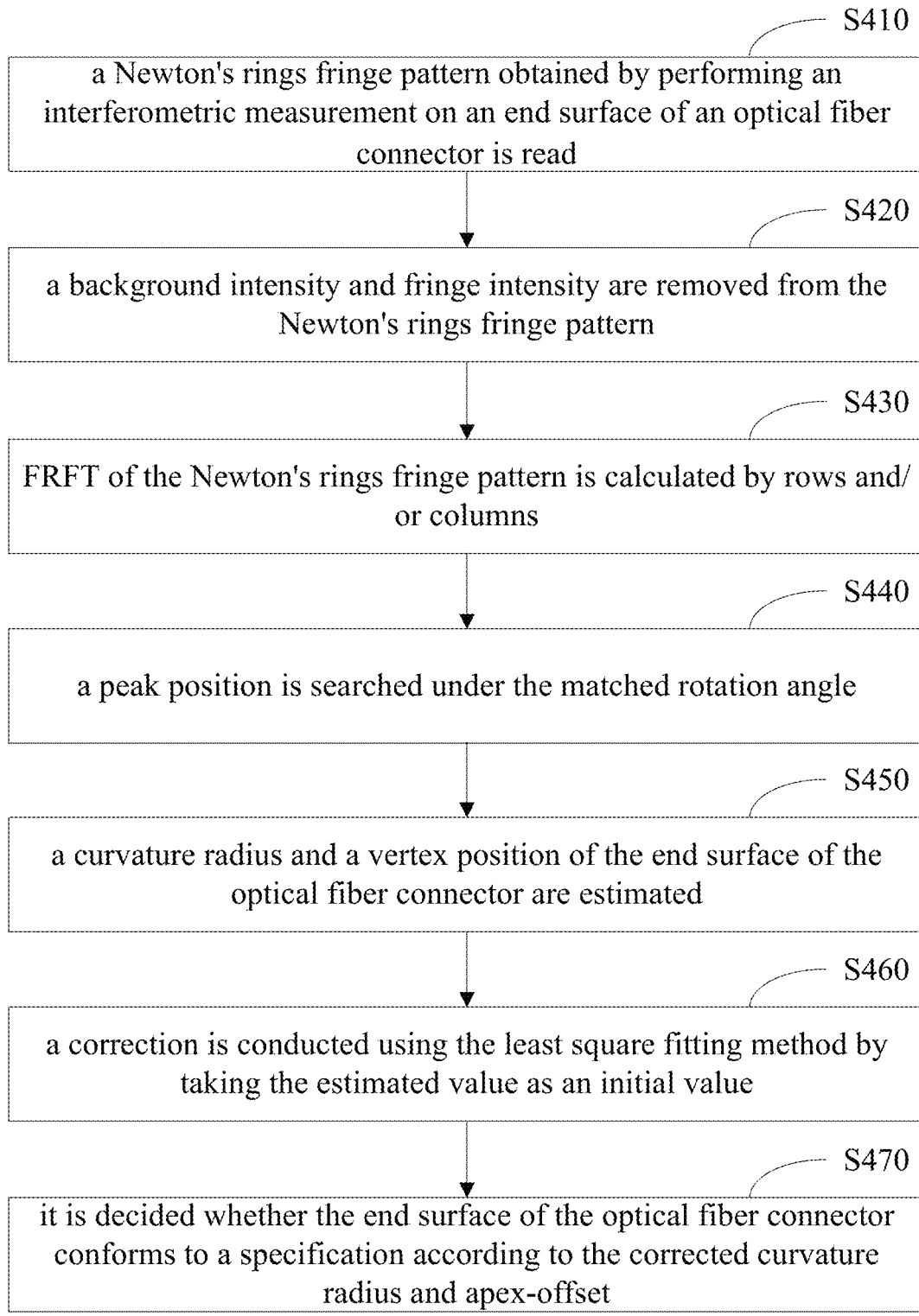
FIG. 12 illustrates a flow chart of an application scenario in which the physical parameter estimating method is used to detect an end surface of an optical fiber connector according to an embodiment of the present disclosure.

FIG. 12 illustrates a flow chart of an application scenario in which the physical parameter estimating method is used to detect an end surface of an optical fiber connector according to an embodiment of the present disclosure.

As shown in FIG. 12, a method for detecting an end surface of an optical fiber connector includes:

In step S410, a Newton's rings fringe pattern obtained by performing an interferometric measurement on an end surface of an optical fiber connector is read.

In step S420, a background intensity and a fringe intensity are removed from the Newton's rings fringe pattern.

In step S430, a fractional Fourier transform (FRFT) of the Newton's rings fringe pattern is calculated by rows and/or columns.

In step S440, a peak position is found under the matched rotation angle.

In step S450, a curvature radius and a vertex position of the end surface of the optical fiber connector are estimated.

In the step S460, a correction is conducted using the least square fitting method by taking the estimated value as an initial value.

Since the steps S410 to S460 have been already explained in the above embodiments, the detailed description thereof is omitted here.

In step S470, it is decided whether the end surface of the optical fiber connector conforms to a specification according to the corrected curvature radius and apex-offset.

After obtaining the curvature radius and the apex-offset of the end surface of the optical fiber connector, they are compared with a production standard. If the curvature radius and the apex-offset of the end surface are in a range specified in the standard, the optical fiber connector is regarded as qualified; otherwise, it is regarded as defective. For example, after deriving the vertex position of the end surface, a difference between the vertex position and the ring-center position of the fiber is calculated, and this difference (also called apex-offset) is compared with the standard to decide whether the end surface of the optical fiber connector is qualified.

Figure 13:
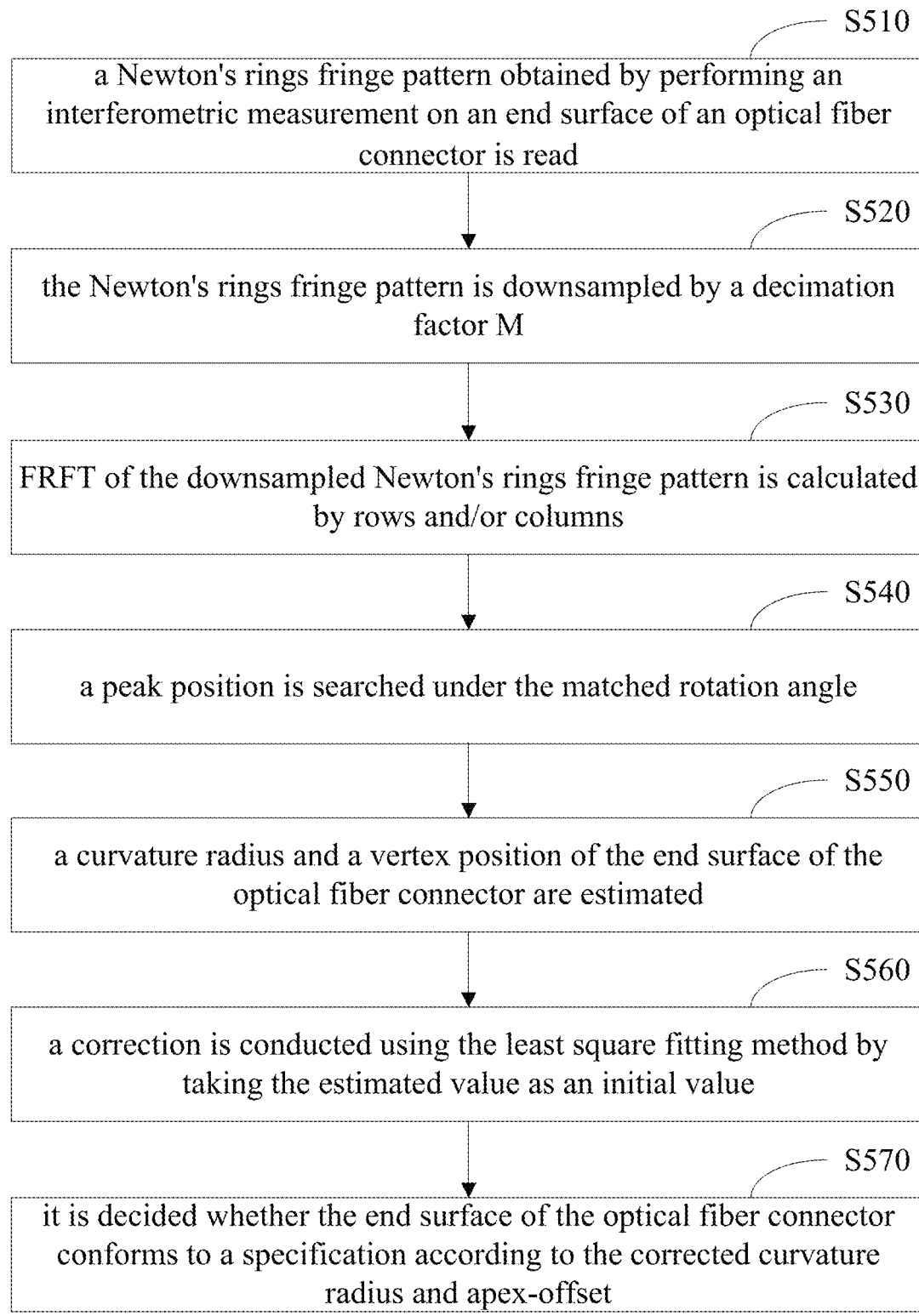
FIG. 13 illustrates another flow chart of an application scenario in which the physical parameter estimating method is used to detect an end surface of an optical fiber connector according to an embodiment of the present disclosure.

FIG. 13 illustrates another flow chart of an application scenario in which the physical parameter estimating method is used to detect an end surface of an optical fiber connector according to an embodiment of the present disclosure.

In step S510, a Newton's rings fringe pattern obtained by performing an interferometric measurement on an end surface of an optical fiber connector is read.

In step S520, the Newton's rings fringe pattern is down-sampled by a decimation factor M, where M is any one of integers being larger than 1 and less than a predetermined maximum sampling factor;

In step S530, a fractional Fourier transform (FRFT) of the downsampled Newton's rings fringe pattern is calculated by rows and/or columns.

In step S540, a peak position is found under the matched rotation angle.

In step S550, a curvature radius and a vertex position of the end surface of the optical fiber connector are estimated.

In step S560, a correction is conducted using a least square fitting method by taking the estimated value as an initial value.

Since steps S510 to S560 have been already explained in the above embodiments, the detailed description thereof is omitted here.

In step S570, it is decided whether the end surface of the optical fiber connector conforms to a specification according to the corrected curvature radius and apex-offset.

Step S570 is the same as Step S470, accordingly a detailed description thereof is omitted here.

Exemplary Device

Hereinafter, physical parameter estimating devices according to respective embodiments of the present disclosure are described with reference to FIGS. 14 and 15.

Figure 14:
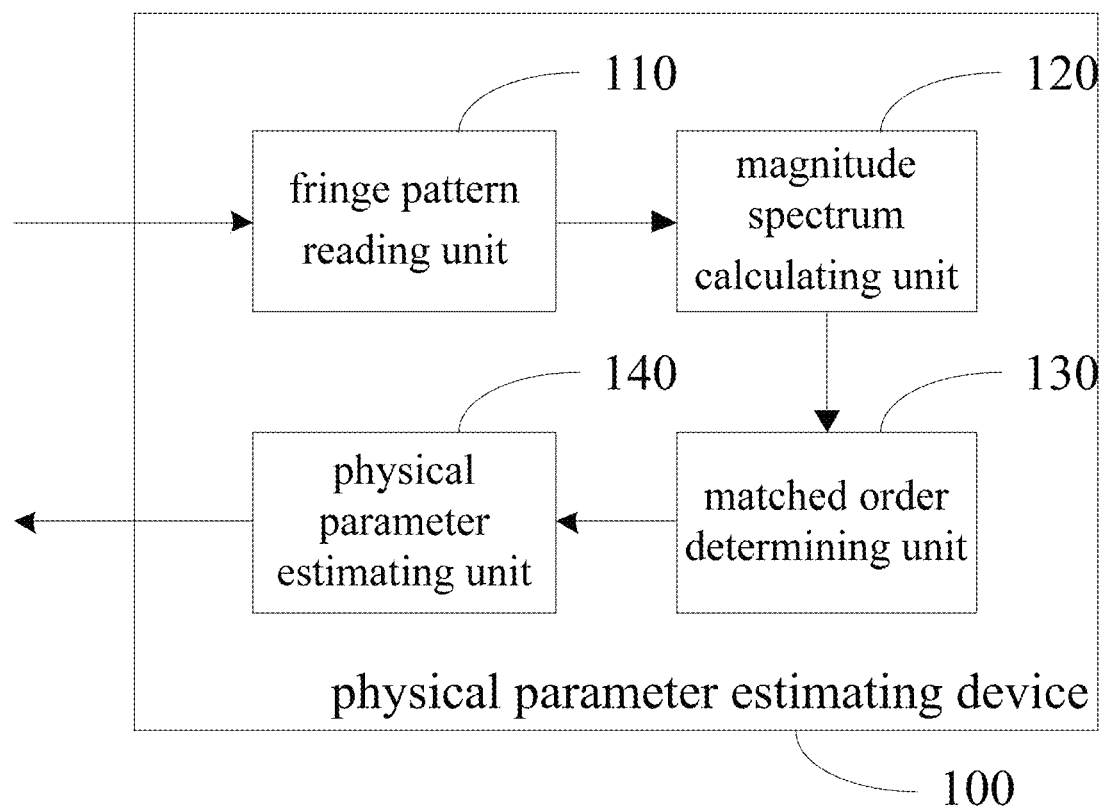
FIG. 14 illustrates a block diagram of a physical parameter estimating device according to the first embodiment of the present disclosure.

FIG. 14 illustrates a block diagram of a physical parameter estimating device according to the first embodiment of the present disclosure.

As shown in FIG. 14, a physical parameter estimating device 100 according to the first embodiment of the present disclosure may include: a fringe pattern reading unit 110 for reading a Newton's rings fringe pattern obtained by performing an interferometric measurement on a unit to be measured; a magnitude spectrum calculating unit 120 for calculating a magnitude spectrum of an intensity distribution signal of at least one first-direction pixel set in the Newton's rings fringe pattern under each fractional Fourier transform (FRFT) order in a searching range of FRFT orders, the first-direction pixel set including a line of pixels in a first direction, the first direction being one of a row direction and a column direction of the Newton's rings fringe pattern; a matched order determining unit 130 for determining a matched order of the intensity distribution signal according to the calculated magnitude spectrums; and a physical parameter estimating unit 140 for estimating a physical parameter involved in the interferometric measurement according to at least the matched order.

In one example, the physical parameter estimating device 100 may further include a pre-processing unit for, after reading a Newton's rings fringe pattern obtained by performing an interferometric measurement on a unit to be measured by the fringe pattern reading unit 110, and before calculating a magnitude spectrum of an intensity distribution signal of at least one first-direction pixel set in the Newton's rings fringe pattern under each fractional Fourier transform (FRFT) order in a searching range of FRFT orders by the magnitude spectrum calculating unit 120, performing at least one of the following operations: removing a background intensity and a fringe intensity from the Newton's rings fringe pattern; and determining ranges of at least some parameters among physical parameters involved in the interferometric measurement according to environment and requirement of the interferometric measurement, determining a value range of a FRFT order according to the ranges of the at least some parameters, and dividing the value range with a proper step size to determine each FRFT order in the searching range of FRFT orders.

In one example, the at least one first-direction pixel set includes only one first-direction pixel set, and the magnitude spectrum calculating unit 120 performs a one-dimension (1-D) FRFT on the intensity distribution signal of the first-direction pixel set under each FRFT order to obtain a 1-D magnitude spectrum for the first-direction pixel set under the FRFT order.

In one example, the matched order determining unit 130 determines a magnitude peak of each of the 1-D magnitude spectrums for the first-direction pixel set; and finds a 1-D magnitude spectrum having a maximum magnitude peak among the 1-D magnitude spectrums for the first-direction pixel set; and determines a FRFT order corresponding to the 1-D magnitude spectrum having the maximum magnitude peak as the matched order.

In one example, the at least one first-direction pixel set includes a plurality of first-direction pixel sets, and with respect to each first-direction pixel set of the plurality of first-direction pixel sets, the magnitude spectrum calculating unit 120 performs a one-dimension (1-D) FRFT on the intensity distribution signal of the first-direction pixel set under each FRFT order to obtain a 1-D magnitude spectrum for the first-direction pixel set under the FRFT order.

In one example, with respect to each first-direction pixel set of the plurality of first-direction pixel sets, the matched order determining unit 130 determines a magnitude peak of each of the 1-D magnitude spectrums for the first-direction pixel set; finds a 1-D magnitude spectrum having a maximum magnitude peak among the 1-D magnitude spectrums for the first-direction pixel set; and determines a FRFT order corresponding to the 1-D magnitude spectrum having the maximum magnitude peak as a matched order for the first-direction pixel set; and determines the matched order of the intensity distribution signal by averaging the matched orders for the plurality of first-direction pixel sets.

In one example, the physical parameter estimating unit 140 determines a first coordinate of the maximum magnitude peak in a 1-D FRFT domain; and determines a first-direction coordinate of a ring-center of the Newton's rings fringe pattern according to the matched order and the first coordinate, the first-direction coordinate being a coordinate in the first direction.

In one example, the physical parameter estimating unit 140 performs the 1-D FRFT on an intensity distribution signal of a second-direction pixel set in the Newton's rings fringe pattern under the matched order, to obtain a 1-D magnitude spectrum for the second-direction pixel set, the second-direction pixel set including a line of pixels in a second direction, the second direction being perpendicular to the first direction; determines a second coordinate of a magnitude peak of the 1-D magnitude spectrum for the second-direction pixel set in the 1-D FRFT domain; and determines a second-direction coordinate of the ring-center of the Newton's rings fringe pattern according to the matched order and the second coordinate, the second-direction coordinate being a coordinate in the second direction.

In one example, the at least one first-direction pixel set includes all of the first-direction pixel sets, and the magnitude spectrum calculating unit 120 performs a two-dimension (2-D) FRFT on the Newton's rings fringe pattern under each FRFT order in the searching range of FRFT orders to obtain a 2-D magnitude spectrum for the Newton's rings fringe pattern under each FRFT order.

In one example, the magnitude spectrum calculating unit 120 performs a one-dimension (1-D) FRFT on the intensity distribution signal of each first-direction pixel set of all of the first-direction pixel sets under each FRFT order to obtain a 1-D magnitude spectrum for the first-direction pixel set under the FRFT order; synthesizes the 1-D magnitude spectrums for all of the first-direction pixel sets under the FRFT order to generate a synthesized magnitude spectrum; and continues to perform the 1-D FRFT on a magnitude distribution signal of each second-direction element set of all of second-direction element sets in the synthesized magnitude spectrum under the FRFT order to obtain the 2-D magnitude spectrum for the Newton's rings fringe pattern under the FRFT order, the second-direction element set including a line of elements in a second direction, the second direction being perpendicular to the first direction.

In one example, the matched order determining unit 130 determines a magnitude peak of each of the 2-D magnitude spectrums for all of the first-direction pixel sets under each FRFT order; finds a 2-D magnitude spectrum having a maximum magnitude peak among the 2-D magnitude spectrums for all of the first-direction pixel sets; and determines a FRFT order corresponding to the 2-D magnitude spectrum having the maximum magnitude peak as the matched order.

In one example, the physical parameter estimating unit 140 determines a coordinate set of a maximum magnitude peak in a 2-D FRFT domain; and determines a coordinate set of a ring-center of the Newton's rings fringe pattern according to the matched order and the coordinate set, the coordinate set of the ring-center including a coordinate in the first direction and a coordinate in the second direction.

In one example, the unit to be measured is an optical device having a surface to be measured, and the physical parameter estimating unit 140 calculates one of three physical parameters used in the interferometric measurement according to the matched order in response to knowing the other two physical parameters, the three physical parameters including a refractive index of media, a wavelength of incident light, and a curvature radius of the surface to be measured.

In one example, the physical parameter estimating device 100 may also include an error correcting unit for correcting errors in the estimated physical parameters after estimating the physical parameter involved in the interferometric measurement according to at least the matched order by the physical parameter estimating unit 140.

In one example, the error correcting unit corrects the estimated physical parameter using an intensity distribution model of the Newton's rings fringe pattern and pixel intensity values in the Newton's rings fringe pattern by taking the estimated physical parameter as an initial value for a least square fitting method.

In one example, the physical parameter estimating device 100 may also include a device quality detecting unit for comparing the estimated physical parameter with a reference physical parameter to determine a difference therebetween; deciding whether the difference is larger than or equal to a predetermined threshold; and determining that the unit to be measured does not conform to a specification for the unit in response to the difference being larger than or equal to the predetermined threshold; otherwise, determining that the unit to be measured conforms to the specification for the unit.

In one example, the unit to be measured is an optical fiber connector having an end face to be measured, and the physical parameter includes a curvature radius and apex-offset of the end face.

Figure 15:
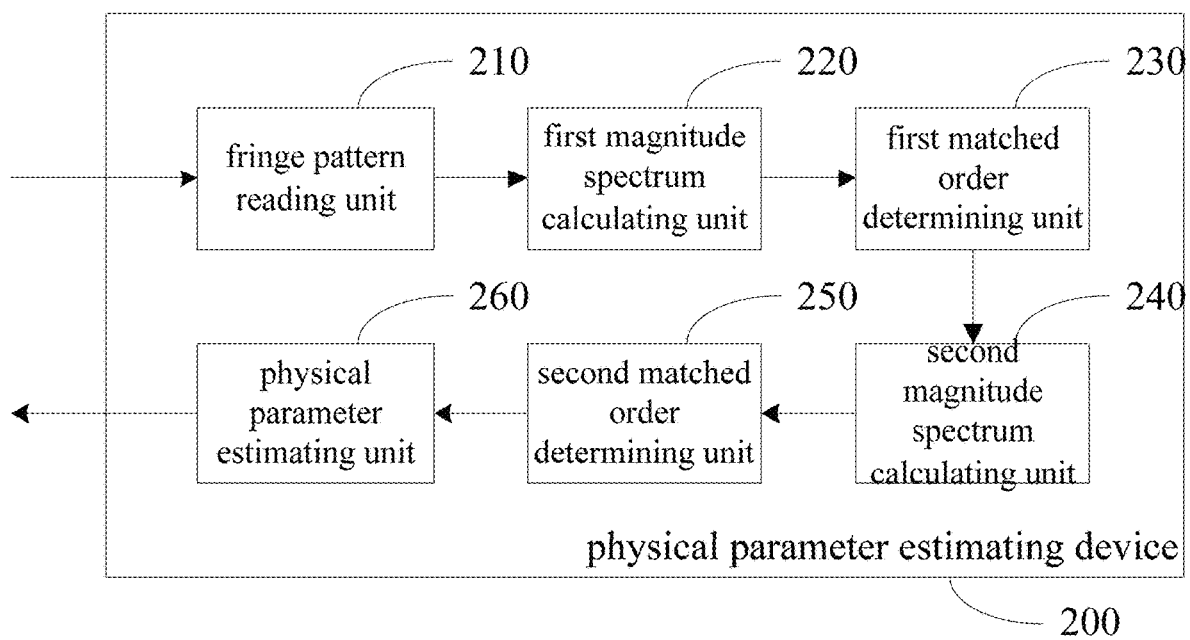
FIG. 15 illustrates a block diagram of a physical parameter estimating device according to the second embodiment of the present disclosure.

FIG. 15 illustrates a block diagram of a physical parameter estimating device according to the second embodiment of the present disclosure.

As shown in FIG. 15, a physical parameter estimating device 200 according to the second embodiment of the present disclosure may include: a fringe pattern reading unit 210 for reading an interference fringe pattern having a quadratic phase obtained by performing an interferometric measurement on a unit to be measured; a first magnitude spectrum calculating unit 220 for calculating a first magnitude spectrum, in a FRFT domain of an intensity distribution signal of at least one first-direction pixel set in the interference fringe pattern under each fractional Fourier transform (FRFT) order in a first searching range of FRFT orders, the first-direction pixel set including a line of pixels in a first direction, the first direction being one of a row direction and a column direction of the interference fringe pattern; a first matched order determining unit 230 for determining a first matched order of the intensity distribution signal of the at least one first-direction pixel set according to the calculated first magnitude spectrums; a second magnitude spectrum calculating unit 240 for calculating a second magnitude spectrum, in the FRFT domain, of an intensity distribution signal of at least one second-direction pixel set in the interference fringe pattern under each FRFT order in a second searching range of FRFT orders, the second-direction pixel set including a line of pixels in a second direction, the second direction being perpendicular to the first direction; a second matched order determining unit 250 for determining a second matched order of the intensity distribution signal of the at least one second-direction pixel set according to the calculated second magnitude spectrums; and a physical parameter estimating unit 260 for estimating a physical parameter involved in the interferometric measurement according to at least the first matched order and the second matched order.

In one example, the physical parameter estimating device 200 may also include a fringe pattern dividing unit for receiving an interference fringe pattern having a complex phase higher than the quadratic phase obtained by performing the interferometric measurement on the unit to be measured; and piecewise-approximating the interference fringe pattern having the complex phase into a plurality of interference fringe patterns having the quadratic phase.

In one example, the physical parameter estimating device 200 may also include a synthesized parameter estimating unit for synthesizing the physical parameters estimated with respect to each of the plurality of interference fringe patterns having the quadratic phase to generate a synthesized physical parameter after estimating the physical parameter involved in the interferometric measurement according to at least the first matched order and the second matched order by the physical parameter estimating unit 260.

Specific functions and operations of the respective units and modules in the above-described physical parameter estimating devices 100 and 200 have been described in detail in the physical parameter estimating method described above with reference to FIGS. 1 to 13, and thus, repetitive description thereof is omitted.

Exemplary Electronic Apparatus

Hereinafter, an electronic apparatus according to the embodiments of the present disclosure is described with reference to FIG. 16. The electronic apparatus may be a computer, a server, a measuring instrument, or other apparatus.

Figure 16:
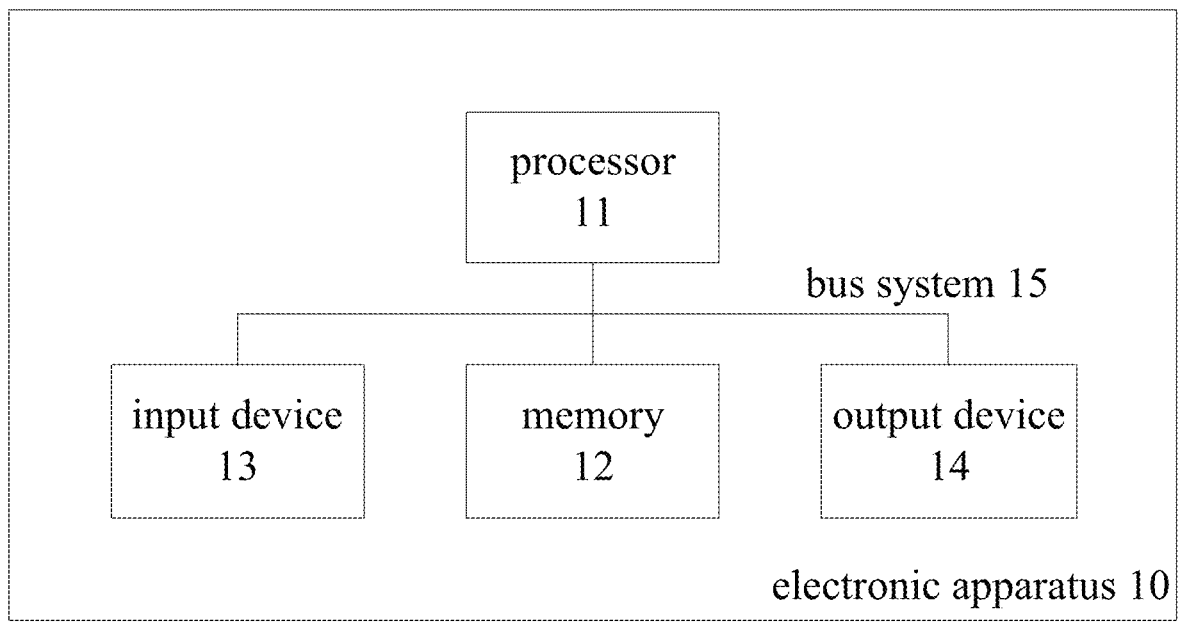
FIG. 16 illustrates a block diagram of an electronic apparatus according to an embodiment of the present disclosure.

FIG. 16 illustrates a block diagram of an electronic apparatus according to an embodiment of the present disclosure.

As shown in FIG. 16, an electronic apparatus 10 includes a processor 11 and a memory 12.

The processor 11 can be a central processing unit (CPU) or a processing unit of other form having data processing capability and/or instruction executing capability, and can control other components in the electronic apparatus 10 to execute desired functions.

The memory 12 may include one or more computer program products, and the computer program products may include various forms of computer-readable storage medium, for example, volatile memory and/or non-volatile memory. For example, the volatile memory may include a random access memory (RAM) and/or a cache memory or the like. For example, the non-volatile memory may include a read-only memory (ROM), a hard disk, a flash memory or the like. One or more computer program instructions may be stored in the computer-readable storage medium, and the processor 11 can execute the computer program instructions to implement the above-mentioned physical parameter estimating method of the respective embodiments of the present disclosure and/or other desired functions. Various kinds of interference fringe patterns, FRFT magnitude spectrums, estimated physical parameters, engineering standard of the unit to be measured, and the like may also be stored in the computer-readable storage medium.

In one example, the electronic apparatus 10 may also include an input device 13 and an output device 14, and these components are interconnected through a bus system 15 and/or other forms of connecting mechanism (not shown). It is to be noted that the components and structure of the electronic apparatus 10 shown in FIG. 16 are only exemplary but not restrictive, and the electronic apparatus 10 may also have other components and structure as necessary.

For example, the input device 13 can receive the interference fringe pattern from outside (for example, from an interferometer or the like). Of course, the interference fringe pattern may also be collected by a collecting device integrated in the electronic apparatus 10.

The output device 14 may output various kinds of information, e.g., the physical parameters, to outside (for example, the user), and may include one or more of a display, a speaker, and the like.

The input device 13 and the output device 14 may be communicated with other devices (for example, a personal computer, a server, a mobile station, a base station or the like) through network or other techniques. The network may be internet, wireless local area network, mobile communication network or the like, and other techniques may include Bluetooth communication, infrared communication or the like, for example.

Exemplary Computer Program Product and Computer-Readable Storage Medium

In addition to above-described methods and apparatus, the embodiment of the present disclosure may be a computer program product including computer program instructions, and the computer program instructions, when executed by a processor, cause the processor to execute the steps in the physical parameter estimating method according to various embodiments of the present disclosure described in the part of "Exemplary method" in this specification.

The computer program product can be written by any combination of one or more programming languages, to execute program codes of the operations of the embodiments of the present disclosure, and the programming language includes object-oriented programming language such as Java, C++ or the like, and further include traditional procedure-type programming language such as "C" language or similar programming language. The program code may be executed fully on the user's computing apparatus, partly on the user's computing apparatus, as a stand-alone software package, partly executed on the user's computing apparatus and partly on a remote computing apparatus, or fully on the remote computing apparatus or server.

Also, the embodiment of the present disclosure may be a computer readable storage medium having computer program instructions stored thereon, and the computer program instructions, when executed by a processor, cause the processor to execute the steps in the physical parameter estimating method according to various embodiments of the present disclosure described in the part of "Exemplary method" in this specification.

The computer-readable storage medium may adopt any combination of one or more readable media. The readable medium may be readable signal medium or readable storage medium. The readable storage medium may include, for example, but not limited to, an electronic, magnetic, optical, electromagnetic, infrared or semiconductor system, apparatus, or device, or any suitable combination thereof. More specific examples (a non-exhaustive list) of the readable storage medium include the following: an electrical connection having one or more wires, a portable disk, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof.

Basic principal of the present disclosure is described above in combination with specific embodiments, however, it is to be noted that advantages and effects or the like set forth in the present disclosure are only example rather than limitation, these advantages and effects or the like cannot be regarded as necessary for respective embodiments of the present disclosure. Further, specific details of above-described disclosure are only for exemplary and for facilitating the understanding rather than limitation, and the present disclosure shall not be limited to being implemented only by adopting the above-described specific details.

Block diagrams of components, devices, apparatus and systems mentioned in the present disclosure are only schematic examples and are not intended to require or imply that connection, arrangement and configuration be implemented according to the manners shown in the block diagrams. Those skilled in the art would understand that these components, devices, apparatus and systems can be connected, arranged or configured in any manner. Words such as "comprise", "include", "have" or the like are inclusive words, which refer to "include but not limited to" and can be interchanged therewith. Words "or" and "and" used here refer to a word "and/or", and can be interchanged therewith, unless otherwise indicated explicitly in context. Word "for example" used here refer to word "for example but not limited to", and can be interchanged therewith.

Further, it needs to point out that, in the device, apparatus and method of the present disclosure, respective components or respective steps can be decomposed and/or re-combined. These decompositions and/or re-combinations should be regarded as equivalent schemes of the present disclosure.

The above description of the disclosed aspects is provided to make those skilled in the art capable of making or using the present disclosure. Various modifications of these aspects are obvious for those skilled in the art, and general principle defined here can be applied to other aspects without departing from range of the present disclosure. Therefore, the present disclosure does not intend to be limited to aspects illustrated here, but covers a widest range in consistent with principle and novel feature disclosed here.

The above description has been already provided in order for exemplification and description. Further, this description does not intend to limit the embodiments of the present disclosure to forms disclosed here. Although a plurality of exemplary aspects and embodiments have been already discussed above, those skilled in the art would appreciate some certain variations, modifications, changes, additions or sub-combinations thereof.

The invention claimed is:

1. A physical parameter estimating method, comprising:
    reading a Newton's rings fringe pattern obtained by performing an interferometric measurement on a unit to be measured;
    downsampling the Newton's rings fringe pattern to obtain a downsampled Newton's rings fringe pattern;
    calculating a magnitude spectrum of an intensity distribution signal of at least one first-direction pixel set in the downsampled Newton's rings fringe pattern under each fractional Fourier transform (FRFT) order in a searching range of FRFT orders, the first-direction pixel set including a line of pixels in a first direction, the first direction being one of a row direction and a column direction of the downsampled Newton's rings fringe pattern;
    determining a matched order of the intensity distribution signal according to the calculated magnitude spectrum; and
    estimating a physical parameter involved in the interferometric measurement according to at least the matched order.

2. The method of claim 1, before the step of downsampling the Newton's rings fringe pattern, further comprising:
    determining a maximum sampling factor of the downsampling in the searching range of FRFT orders.

3. The method of claim 2, wherein the step of downsampling the Newton's rings fringe pattern comprises: downsampling the Newton's rings fringe pattern at least in the first direction by a decimation factor M, where M is any one of integers being larger than 1 and less than the maximum sampling factor.

4. The method of claim 2, wherein the step of downsampling the Newton's rings fringe pattern comprises:
    simultaneously downsampling the Newton's ring fringe pattern by a decimation factor M in the first direction and the second direction, where M is any one of integers being larger than 1 and less than the maximum sampling factor, the second direction being perpendicular to the first direction.

5. The method of claim 2, wherein the step of determining a maximum sampling factor of the downsampling in the searching range of FRFT orders comprises:
    searching for a first FRFT order in the searching range of FRFT orders, where the first FRFT order corresponds to the maximum sampling factor;
    calculating the magnitude spectrum of the intensity distribution signal of a selected row of pixels or a selected column of pixels in the Newton's rings fringe pattern; and
    calculating the maximum sampling factor according to a rotation angle corresponding to the first FRFT order and according to a bandwidth determined based on the maximum magnitude peak of the magnitude spectrum.

6. The method of claim 5, wherein the step of searching for a first FRFT order in the searching range of FRFT orders comprises:
    selecting one of a minimum FRFT order and a maximum FRFT order in the searching range of FRFT orders as the first FRFT order.

7. The method of claim 5, wherein a first value corresponding to the first FRFT order is larger than or equal to a first value corresponding to any other FRFT order in the searching range of FRFT orders, where the first value corresponding to the FRFT order equals to a quotient obtained from an absolute value of a sine of the rotation angle divided by a product of the bandwidth determined on the basis of the maximum magnitude peak in the magnitude spectrum multiplied by a physical size of a single pixel in the Newton's rings fringe pattern.

8. The method of claim 7, wherein the bandwidth determined on the basis of the maximum magnitude peak in the magnitude spectrum is 3 dB bandwidth of the maximum magnitude peak in the magnitude spectrum.

9. The method of claim 1, before the step of downsampling the Newton's rings fringe pattern, further comprising:
    determining range of at least some parameters among physical parameters involved in the interferometric measurement according to environment and requirements of the interferometric measurement;
    determining a value range of a FRFT order according to the ranges of the at least some parameters; and
    dividing the value range with a proper step size to determine each FRFT order in the searching range of FRFT orders.

10. The method of claim 1, wherein the at least one first-direction pixel set includes only one first-direction pixel set, and the step of calculating a magnitude spectrum of an intensity distribution signal of at least one first-direction pixel set in the down-sampled Newton's rings fringe pattern under each fractional Fourier transform (FRFT) order in a searching range of FRFT orders comprises:
    performing a one-dimension (1-D) FRFT on the intensity distribution signal of the first-direction pixel set in the downsampled Newton's rings fringe pattern under each FRFT order, to obtain a 1-D magnitude spectrum for the first-direction pixel set under the FRFT order.

11. The method of claim 10, wherein the step of estimating a physical parameter involved in the interferometric measurement according to at least the matched order comprises:
determining a first coordinate of a maximum magnitude peak of the 1-D magnitude spectrum having the maximum magnitude peak among the 1-D magnitude spectrums in a 1-D FRFT domain; and
determining a first-direction coordinate of the ring-center of the Newton's rings fringe pattern according to the matched order and the first coordinate, the first-direction coordinate being a coordinate in the first direction.

12. The method of claim 11, wherein the step of estimating a physical parameter involved in the interferometric measurement according to at least the matched order further comprises:
performing the 1-D FRFT on an intensity distribution signal of a second-direction pixel set in the downsampled Newton's rings fringe pattern under the matched order, to obtain a 1-D magnitude spectrum for the second-direction pixel set, the second-direction pixel set including a line of pixels in a second direction, the second direction being perpendicular to the first direction;
determining a second coordinate of a magnitude peak of the 1-D magnitude spectrum for the second-direction pixel set in the 1-D FRFT domain; and
determining a second-direction coordinate of the ring-center of the Newton's rings fringe pattern according to the matched order and the second coordinate, the second-direction coordinate being a coordinate in the second direction.

13. The method of claim 1, wherein the step of estimating a physical parameter involved in the interferometric measurement according to at least the matched order comprises:
performing a 1-D FRFT on an intensity distribution signal of a first-direction pixel set in a pre-downsampling Newton's rings fringe pattern under the matched order, to obtain a 1-D magnitude spectrum for the first-direction pixel set;
determining a first coordinate of a maximum magnitude peak of the 1-D magnitude spectrum in a 1-D FRFT domain; and
determining a first-direction coordinate of a ring-center of the Newton's rings fringe pattern according to the matched order and the first coordinate, the first-direction coordinate being a coordinate in the first direction.

14. The method of claim 13, wherein the step of estimating a physical parameter involved in the interferometric measurement according to at least the matched order further comprises:
performing the 1-D FRFT on an intensity distribution signal of a second-direction pixel set in the pre-downsampling Newton's rings fringe pattern under the matched order, to obtain a 1-D magnitude spectrum for the second-direction pixel set, the second-direction pixel set including a line of pixels in a second direction, the second direction being perpendicular to the first direction;
determining a second coordinate of a magnitude peak of the 1-D magnitude spectrum for the second-direction pixel set in the 1-D FRFT domain; and
determining a second-direction coordinate of the ring-center of the Newton's rings fringe pattern according to the matched order and the second coordinate, the second-direction coordinate being a coordinate in the second direction.

15. The method of claim 1, wherein the at least one first-direction pixel set includes all of first-direction pixel sets, and the step of calculating a magnitude spectrum of an intensity distribution signal of at least one first-direction pixel set in the downsampled Newton's rings fringe pattern under each fractional Fourier transform (FRFT) order in a searching range of FRFT orders comprises:
performing a two-dimension (2-D) FRFT on the downsampled Newton's rings fringe pattern under each FRFT order, to obtain a 2-D magnitude spectrum for the downsampled Newton's rings fringe pattern under the FRFT order.

16. The method of claim 15, wherein the step of estimating a physical parameter involved in the interferometric measurement according to at least the matched order comprises:
determining a coordinate set of a maximum magnitude peak in the 2-D magnitude spectrum having the maximum magnitude peak among the 2-D magnitude spectrums in a 2-D FRFT domain; and
determining a coordinate set of a ring-center of the Newton's rings fringe pattern according to the matched order and the coordinate set, the coordinate set of the ring-center including a coordinate in the first direction and a coordinate in a second direction, the second direction being perpendicular to the first direction.

17. The method of claim 1, wherein the step of estimating a physical parameter involved in the interferometric measurement according to at least the matched order comprises:
performing a 2-D FRFT on a pre-downsampling Newton's rings fringe pattern under the matched order, to obtain a 2-D magnitude spectrum for the pre-downsampling Newton's rings fringe pattern under the matched order;
determining a coordinate set of a maximum magnitude peak of the 2-D magnitude spectrum in a 2-D FRFT domain; and
determining a coordinate set of a ring-center of the Newton's rings fringe pattern according to the matched order and the coordinate set, the coordinate set of the ring-center including a coordinate in the first direction and a coordinate in a second direction, the second direction being perpendicular to the first direction.

18. The method of claim 1, wherein the unit to be measured is an optical device having a surface to be measured, and the step of estimating a physical parameter involved in the interferometric measurement according to at least the matched order comprises:
calculating one of three physical parameters used in the interferometric measurement according to the matched order in response to knowing the other two physical parameters, the three physical parameters including a refractive index of media, a wavelength of incident light, and a curvature radius of the surface to be measured.

19. The method of claim 1, after the step of estimating a physical parameter involved in the interferometric measurement according to the matched order, further comprising:
correcting the physical parameter using an intensity distribution model of a pre-downsampling Newton's rings fringe pattern and pixel intensity values in the pre-downsampling Newton's rings fringe pattern by taking the estimated physical parameter as an initial value for a least square fitting method.

20. An electronic apparatus, comprising:
a processor;
a memory; and
computer program instructions stored in the memory that, when executed by the processor, cause the processor to perform a physical parameter estimating method comprising:
reading a Newton's rings fringe pattern obtained by performing an interferometric measurement on a unit to be measured;
downsampling the Newton's rings fringe pattern to obtain a downsampled Newton's rings fringe pattern;
calculating a magnitude spectrum of an intensity distribution signal of at least one first-direction pixel set in the downsampled Newton's rings fringe pattern under each fractional Fourier transform (FRFT) order in a searching range of FRFT orders, the first-direction pixel set including a line of pixels in a first direction, the first direction being one of a row direction and a column direction of the downsampled Newton's rings fringe pattern;
determining a matched order of the intensity distribution signal according to the calculated magnitude spectrums; and
estimating a physical parameter involved in the interferometric measurement according to at least the matched order.

* * * * *